(12) United States Patent
Kapoor

(10) Patent No.: US 9,805,424 B2
(45) Date of Patent: Oct. 31, 2017

(54) ROLE BASED MODULAR REMITTANCES IN A MODULAR LEARNING SYSTEM

(75) Inventor: Samridh Kapoor, Mumbai (IN)

(73) Assignees: Monk Akarshala Design Private Limited, Mumbai (IN); Monk Akarshala Inc., Sacramento, CA (US)

(*) Notice: Subject to any disclaimer, the term of this patent is extended or adjusted under 35 U.S.C. 154(b) by 0 days.

(21) Appl. No.: 14/344,818

(22) PCT Filed: Sep. 13, 2012

(86) PCT No.: PCT/US2012/054966
§ 371 (c)(1),
(2), (4) Date: Mar. 13, 2014

(87) PCT Pub. No.: WO2013/040113
PCT Pub. Date: Mar. 21, 2013

(65) Prior Publication Data
US 2014/0344126 A1 Nov. 20, 2014

(30) Foreign Application Priority Data
Sep. 13, 2011 (IN) .......................... 2578/MUM/2011

(51) Int. Cl.
| | | |
|---|---|---|
| G07F 19/00 | (2006.01) | |
| H04M 15/00 | (2006.01) | |
| G06Q 40/00 | (2012.01) | |
| G06Q 20/14 | (2012.01) | |
| G06Q 30/06 | (2012.01) | |
| G09B 5/08 | (2006.01) | |
| G09B 7/00 | (2006.01) | |
| G06Q 30/04 | (2012.01) | |
| G06Q 50/20 | (2012.01) | |

(52) U.S. Cl.
CPC ........... *G06Q 40/12* (2013.12); *G06Q 20/145* (2013.01); *G06Q 30/04* (2013.01); *G06Q 30/06* (2013.01); *G06Q 50/20* (2013.01); *G09B 5/08* (2013.01); *G09B 7/00* (2013.01)

(58) Field of Classification Search
None
See application file for complete search history.

(56) References Cited

U.S. PATENT DOCUMENTS 7,686,210 B2 3/2010 Bolle et al.
7,809,618 B2 10/2010 Velona
(Continued)

*Primary Examiner* — Fateh M Obaid
(74) *Attorney, Agent, or Firm* — Nixon Peabody LLP

(57) ABSTRACT

An apparatus and method are disclosed for managing modular remittances in a modular learning system. Learning applications are stored in the modular learning system, each associated with a service charge and a remitted user. The remitted user is also associated with a remittance cycle. The modular learning system receives a purchase request from a learning user specifying a learning application, and subtracts a service charge associated with the specified learning application from an account balance of the learning user to compute an updated balance. Based on the remittance cycle of the remitted user associated with the specified learning application, the modular learning system determines a time to remit the service charge to the remitted user. The modular learning system remits the service charge at the determined time, and displays the updated balance to the learning user.

11 Claims, 21 Drawing Sheets

(56) References Cited

U.S. PATENT DOCUMENTS

| | | |
|---|---|---|
| 2002/0174041 A1* | 11/2002 | Grey et al. .................... 705/32 |
| 2003/0101113 A1* | 5/2003 | Dang et al. .................... 705/31 |
| 2004/0153508 A1* | 8/2004 | Alcorn et al. ................ 709/205 |
| 2005/0214729 A1 | 9/2005 | Greenly et al. |
| 2006/0287953 A1* | 12/2006 | Chauhan ....................... 705/39 |
| 2007/0100651 A1* | 5/2007 | Ramer et al. .................. 705/1 |
| 2009/0177529 A1* | 7/2009 | Hadi ............................ 705/10 |
| 2010/0004969 A1* | 1/2010 | Menear et al. ................. 705/8 |

* cited by examiner

Tutor Account Summary

500

Tutor Name : Anamika A
Tutor Registration No : TU11201

Remittance Cycle : 90 days
Current Cycle : 15.4.11 to 14.7.11

ACCOUNT SUMMARY 502

| Particulars | Units (hh:mm:ss) | Amount ₹ |
|---|---|---|
| Net Tutor Access Remittance 504 | 13:27:12 | 9596.87 |
| Net Remittances (A) | | 9596.87 |
| Less: | | |
| Registration Charges 506 | | 110.3 |
| Total Expenses (B) | | 110.30 |
| Amount Due to Tutor (A)-(B) | | 9486.57 |

*FIG. 5A*

| Tutor Registration Charges 506 | | | |
|---|---|---|---|
| Date of Registration | Quantity | Rate ₹ | Amount ₹ |
| 1.5.11 | 1 | 100.00 | 100.00 |
| Service Tax | | | 10.30 |
| Total | | | 110.30 |

| Tutor Access Billing 508 | | | | | | | |
|---|---|---|---|---|---|---|---|
| Date | Log in | Log out | Duration | Rate ₹/hr* | Amount/ Learner | Tutor: Learner Ratio | Amount ₹ |
| 25.6.11 | 10:25:45 | 11:31:15 | 01:05:45 | 40.80 | 44.88 | 1 | 44.88 |
| 21.6.11 | 15:11:36 | 17:23:47 | 02:12:11 | 81.59 | 187.66 | 2 | 375.314 |
| 15.6.11 | 14:25:08 | 14:40:37 | 00:15:29 | 122.39 | 36.67 | 2 | 73.3434 |
| 13.6.11 | 09:16:25 | 10:34:23 | 01:17:58 | 163.19 | 48.96 | 6 | 293.742 |
| 11.6.11 | 08:45:25 | 10:43:23 | 00:57:58 | 203.99 | 203.99 | 1 | 203.99 |
| 9.6.11 | 18:58:00 | 19:22:01 | 00:24:01 | 244.78 | 122.39 | 6 | 734.34 |
| 7.6.11 | 21:01:19 | 21:30:47 | 00:29:28 | 285.58 | 142.79 | 4 | 571.16 |
| 5.6.11 | 13:25:28 | 14:40:53 | 01:15:25 | 326.38 | 424.29 | 9 | 3818.646 |
| 3.6.11 | 17:25:37 | 20:54:35 | 03:28:58 | 367.17 | 1285.10 | 3 | 3855.285 |
| 1.6.11 | 11:28:49 | 13:28:48 | 01:59:59 | 407.97 | 815.94 | 1 | 815.94 |
| Total | | | 13:27:12 | | | | 10786.64 |
| Service Charges | | | | | | | 1078.66 |
| Service Tax | | | | | | | 111.10 |
| Net Tutor Access Remittance 504 | | | | | | | 9596.87 |

*Learning Pulse 6 minutes

FIG. 5B

Learning Application Author Account Summary

Learning Application Author Name : Anamika B
Learning Application Author Regn No : LAA10401

Remittance Cycle : 90 days
Current Cycle : 15.4.11 to 14.7.11

ACCOUNT SUMMARY 602

| Particulars | Units (copies) | Amount ₹ |
|---|---|---|
| Net Learning Application Sales Remittance 604 | 10 | 1996.34 |
| Net Remittances (A) | | 1996.34 |
| Less: | | |
| Registration Charges 606 | | 110.30 |
| Total Expenses (B) | | 110.30 |
| Amount Due to Author (A)-(B) | | 1886.04 |

600

Learning Application Author Registration Charges 606

| Date of Registration | Quantity | Rate ₹ | Amount ₹ |
|---|---|---|---|
| 1.5.11 | 1 | 100.00 | 100.00 |
| Service Tax | | | 10.30 |
| Total | | | 110.30 |

Learning Application Sales Billing 608

| Learning Application Code | Quantity | Rate ₹ | Amount ₹ |
|---|---|---|---|
| SWMP001 | 1 | 40.80 | 40.80 |
| ACCP005 | 1 | 81.59 | 81.59 |
| PSYP105 | 1 | 122.39 | 122.39 |
| HISP045 | 1 | 163.19 | 163.19 |
| CALP088 | 1 | 203.99 | 203.99 |
| CRIP111 | 1 | 244.78 | 244.78 |
| ASTP145 | 1 | 285.58 | 285.58 |
| DESP745 | 1 | 326.38 | 326.38 |
| BOTP048 | 1 | 367.17 | 367.17 |
| OCHP111 | 1 | 407.97 | 407.97 |
| Total | 10 | | 2243.84 |
| Service Charges | | | 224.38 |
| Service Tax | | | 23.11 |
| Net Learning Application Sales Remittance 604 | | | 1996.34 |

*FIG. 6B*

Template Developer Account Summary

Template Developer Name : Anamika C
Template Developer Registration No : TD11001

Remittance Cycle : 90 days
Current Cycle : 15.4.11 to 14.7.11

ACCOUNT SUMMARY 702

| Particulars | Units | Amount ₹ |
|---|---|---|
| Net Template Sales Remittance 704 | 10 | 11121.25 |
| Net Remittances (A) | | 11121.25 |
| Less: | | |
| Registration Charges 706 | | 110.30 |
| Total Expenses (B) | | 110.30 |
| Amount Due to Template Developer (A)-(B) | | 11010.95 |

*FIG. 7A*

Template Developer Registration Charges 706

| Date of Registration | | | Quantity | Rate ₹ | Amount ₹ |
|---|---|---|---|---|---|
| 1.5.11 | | | 1 | 100.00 | 100.00 |
| | | | Service Tax | | 10.30 |
| | | | Total | | 110.30 |

Template Sales Billing 708

| Date | Template Code | Learning Application | Application Author Registration No | Quantity | Rate ₹ | Amount ₹ |
|---|---|---|---|---|---|---|
| 26.6.11 | TTSWM00543 | SW001 | LAA001 | 1 | 1000.00 | 1000.00 |
| 22.6.11 | TTAAC00121 | AC005 | LAA009 | 1 | 1500.00 | 1500.00 |
| 16.6.11 | TTPSY01234 | PS105 | LAA158 | 1 | 1000.00 | 1000.00 |
| 14.6.11 | TTHIS05432 | HI045 | LAA244 | 1 | 1500.00 | 1500.00 |
| 12.6.11 | TTCAL51237 | CA088 | LAA914 | 1 | 1000.00 | 1000.00 |
| 10.6.11 | TTCRI00789 | CR111 | LAA029 | 1 | 1500.00 | 1500.00 |
| 8.6.11 | TTAST00762 | AS145 | LAA037 | 1 | 1000.00 | 1000.00 |
| 6.6.11 | TTSDES21034 | DE745 | LAA598 | 1 | 1500.00 | 1500.00 |
| 4.6.11 | TTBOT13579 | BO048 | LAA279 | 1 | 1000.00 | 1000.00 |
| 2.6.11 | TTOCH02468 | OC111 | LAA398 | 1 | 1500.00 | 1500.00 |
| Total | | | | 10 | | 12500.00 |
| | | | Service Charges | | | 1250.00 |
| | | | Service Tax | | | 128.75 |
| | | | Net Template Sales Remittance 704 | | | 11121.25 |

*FIG. 7B*

Application Translator Registration Charges 806

| Date of Registration | | | Quantity | Rate ₹ | Amount ₹ |
|---|---|---|---|---|---|
| 1.5.11 | | | 1 | 100.00 | 100.00 |
| | | | | Service Tax | 10.30 |
| | | | | Total | 110.30 |

Translation Service Sales Billing 808

| Translation Item | Learning Application | Application Author Regn No | Quantity | Rate ₹ | Amount ₹ |
|---|---|---|---|---|---|
| 0102 | SW001 | LAA001 | 1 | 100.00 | 100.00 |
| 0203 | AC005 | LAA009 | 1 | 200.00 | 200.00 |
| 0304 | PS105 | LAA158 | 1 | 5000.00 | 5000.00 |
| 0540 | HI045 | LAA244 | 1 | 7000.00 | 7000.00 |
| 0820 | CA088 | LAA914 | 1 | 1500.00 | 1500.00 |
| 0912 | CR111 | LAA029 | 1 | 7500.00 | 7500.00 |
| 1050 | AS145 | LAA037 | 1 | 2400.00 | 2400.00 |
| 1871 | DE745 | LAA598 | 1 | 3100.00 | 3100.00 |
| 2345 | BO048 | LAA279 | 1 | 8900.00 | 8900.00 |
| 2713 | OC111 | LAA398 | 1 | 4700.00 | 4700.00 |
| Total | | | 10 | | 40400.00 |
| | | | | Service Charges | 4040.00 |
| | | | | Service Tax | 416.12 |
| Net Translation Service Sales Remittance 804 | | | | | 35943.88 |

*FIG. 8B*

PROVISIONAL SPECIFICATION

900A

Learning Facility Account Summary

Learning Facility Administrator Name: Anamika E
Learning Faciilty Registration No. LF 121401

Remittance Cycle: 90 days
Current Cycle: 15.4.11 to 14.7.11

ACCOUNT SUMMARY 902

| Particulars | Units | Amount ₹ |
|---|---|---|
| Net Learning Facility Access Remittance 904 | 13:27:12 | 9596.87 |
| Net Tool Sales Remittance 906 | 13:27:12 | 3364.68 |
| Net Tool Rental Remittance 908 | 10 | 2947.28 |
| Net Remittances (A) | | 15908.83 |
| Less: | | |
| Registration Charges 910 | 1 | 10000.00 |
| Franchise Royalty 912 | 1 | 20000.00 |
| Learning Infrastructure Rental 914 | XX:YY:ZZ | 4728000.00 |
| Learning Infrastructure Purchased 916 | 10 | 9456000.00 |
| Learning Infrastructure Maintenance Charges 918 | 2 | 187200.00 |
| Learning Tools Rental 920 | XX:YY:ZZ | 3312.66 |
| Learning Tools Purchased 922 | 10 | 2243.84 |
| Learning Infrastructure Installation Charges 924 | 20 | 1891200.00 |
| Total Before Tax | | 16297956.5 |
| Tax 926 | | 1679052.66 |
| Total Expenses (B) | | 17977009.15 |
| Amount Due By Learning Facility Administering User (B)-(A) | | 17961100.32 |

*FIG. 9A*

Learning Facility Registration Charges 910

| Date of Registration | Learning Facility | | Quantity | Rate | Amount |
|---|---|---|---|---|---|
| | Registration No | | | ₹ | ₹ |
| 1.6.11 | LF12401 | | 1 | 10000.00 | 10000.00 |
| | Total | | | | 10000.00 |

Learning Facility Franchise Royalty 912

| Date | Learning Facility | | Quantity | Rate | Amount |
|---|---|---|---|---|---|
| | Registration No | | | ₹ | ₹ |
| 1.6.11 | LF12401 | | 1 | 20000.00 | 20000.00 |
| | Total | | | | 20000.00 |

*FIG. 9B*

PROVISIONAL SPECIFICATION

1000A

Learning Event Organiser Account Summary

Learning Event Organiser Name: Anamika F
Learning Event Organiser Registration No. LO11061

Remittance Cycle: 90 days
Current Cycle: 15.4.11 to 14.7.11

ACCOUNT SUMMARY 1002

| Particulars | Units | Amount ₹ |
|---|---|---|
| Net Learning Event Sales Remittance 1004 | XX | 2460020.50 |
| Net Remittances (A) | | 2460020.50 |
| Less: | | |
| Registration Charges 1006 | 1 | 10000.00 |
| Inspection Charges 1008 | 10 | 2243.84 |
| Learning Application Services Purchased 1010 | XX | 2128000.00 |
| Total Before Tax | | 2140243.84 |
| Tax 1012 | | 220492.80 |
| Total Expenses (B) | | 2360736.64 |
| Amount Due to Learning Event Organiser (A)-(B) | | 99283.86 |

*FIG. 10A*

| Learning Event Organiser Registration Charges 1006 | | | |
|---|---|---|---|
| Date of Registration | Quantity | Rate ₹ | Amount ₹ |
| 1.5.11 | 1 | 10000.00 | 10000.00 |
| Total | | | 10000.00 |

| Inspection Charges 1008 | | | |
|---|---|---|---|
| Date | Learning Event Code | Rate ₹ | Amount ₹ |
| 1.5.11 | PSYEXCIND020 | 40.80 | 40.80 |
| 3.5.11 | SWIEXCSUI001 | 81.59 | 81.59 |
| 5.5.11 | ACFLDUS005 | 122.39 | 122.39 |
| 7.5.11 | PHYFLDIN105 | 163.19 | 163.19 |
| 9.5.11 | HISEXCLAT045 | 203.99 | 203.99 |
| 11.5.11 | CALEXCNED088 | 244.78 | 244.78 |
| 13.5.11 | CRIEXCUK111 | 285.58 | 285.58 |
| 15.5.11 | ASTFLDIND145 | 326.38 | 326.38 |
| 17.5.11 | DESINDIND745 | 367.17 | 367.17 |
| 19.5.11 | BOTFLDCOS048 | 407.97 | 407.97 |
| Total | | | 2243.84 |

*FIG. 10B*

PROVISIONAL SPECIFICATION

1100A — Tool Supplier Account Summary

Learning Tool Supplier Name: Anamika G
Learning Tool Supplier Registration No. LT11801

Remittance Cycle: 90 days
Current Cycle: 15.4.11 to 14.7.11

ACCOUNT SUMMARY 1102

| Particulars | Units | Amount ₹ |
|---|---|---|
| Net Learning Tool Sales Remittances 1104 | 10 | 4198.20 |
| Net Learning Tools Rental Remittances 1106 | XX:YY:ZZ | 2947.28 |
| Total Remittances (A) | | 7145.48 |
| Less: | | |
| Registration Charges 1108 | 1 | 110.30 |
| Total Expenses (B) | | 110.30 |
| Amount Due to You (A)-(B) | | 7035.181 |

*FIG. 11A*

| Tool Supplier Registration Charges 1108 | | | |
|---|---|---|---|
| Date of Registration | Quantity | Rate ₹ | Amount ₹ |
| 1.5.11 | 1 | 100.00 | 100.00 |
| Service Tax | | | 10.30 |
| Total | | | 110.30 |

| Learning Tool Sales 1110 | | | |
|---|---|---|---|
| Date | Tool Code | Quantity | Rate ₹ | Amount ₹ |
| 25.6.11 | TAB | 1 | 99.00 | 99.00 |
| 21.6.11 | TCD | 1 | 199.00 | 199.00 |
| 15.6.11 | TEF | 1 | 299.00 | 299.00 |
| 13.6.11 | TGH | 1 | 599.00 | 599.00 |
| 11.6.11 | TIJ | 1 | 399.00 | 399.00 |
| 9.6.11 | TKL | 1 | 699.00 | 699.00 |
| 7.6.11 | TMN | 1 | 499.00 | 499.00 |
| 5.6.11 | TOP | 1 | 899.00 | 899.00 |
| 3.6.11 | TQR | 1 | 799.00 | 799.00 |
| 1.6.11 | TST | 1 | 999.00 | 999.00 |
| | Total | 10 | | 5490.00 |
| | Service Charges | | | 549.00 |
| | Service Tax | | | 56.55 |
| | VAT @ 12.5% | | | 686.25 |
| | Net Learning Tool Sales Remittance 1104 | | | 4198.20 |

FIG. 11B

ROLE BASED MODULAR REMITTANCES IN A MODULAR LEARNING SYSTEM

CROSS-REFERENCE TO RELATED APPLICATIONS

This application is a U.S. National Stage of International Application No. PCT/US2012/054966, filed Sep. 12, 2012, which claims the benefit of Indian Provisional Specification No. 2578/MUM/2011, titled "Role Based Modular Remittance In A Modular Learning System" filed on Sep. 13, 2011, both of which are incorporated by reference herein in their entireties.

FIELD OF THE ART

The present invention relates generally to modular learning systems, and more particularly to managing role based modular remittances in a modular learning system environment.

DESCRIPTION OF THE RELATED ART

A learning ecosystem includes a plurality of members who establish a variety of transactional and functional relationships with each other. These members include students (or learners), teachers (or tutors, professors, guides, coaches, lecturers and the like), authors (of textbooks and other educational media, content, software and the like), as well as many other kinds of educational product and service providers. Such learning product and service providers are paid through another organization or business, with the learner paying primarily for a consolidated product or service purchased from an educational institution like a preschool, school, college, university or other training organization in the form of an admission or tuition fee.

However, modular learning systems, especially those offering the purchase and performance of discrete microlearning experiences, cannot offer salaries to a plurality of learning products and services providers, since they are not a part of the provider's organization, but are independent transactional and functional entities who are deployed, but not employed, by the modular learning system as a part of the provider's ecosystem.

Therefore, it is desirable to develop a system and method which could allow remittance of prescribed fees for utilization of learning products and services to learning products and services providers.

In view of above, the present inventor proposes a novel method and system for managing role based modular remittances in a modular learning system environment.

SUMMARY

A system and method for managing the purchase and performance of a learning application and associated application services stack is provided. A modular learning system stores and manages a plurality of learning applications. The learning applications comprise learning content and metadata for determining compatibility of the learning application with users and learning services required for performing the learning application. Prior to purchasing and using a learning application, a learning user is verified as compatible for receiving and using the learning application.

In another aspect the invention further provides a non-transitory computer readable storage medium storing computer program instructions executable by a processor for performing a method for managing modular remittances in a modular learning system, in accordance with the invention.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 5 illustrates a tutor remittance summary interface generated by the role based remittance module according to one embodiment.

FIG. 7 illustrates a template developer remittance summary interface generated by the role based remittance module according to one embodiment.

FIG. 9 illustrates a learning facility remittance summary interface generated by the role based remittance module according to one embodiment.

FIG. 10 illustrates a learning event organizer remittance summary interface generated by the role based remittance module according to one embodiment.

FIG. 11 illustrates a tool supplier remittance summary interface generated by the role based remittance module according to one embodiment.

DETAILED DESCRIPTION

Figure 1:
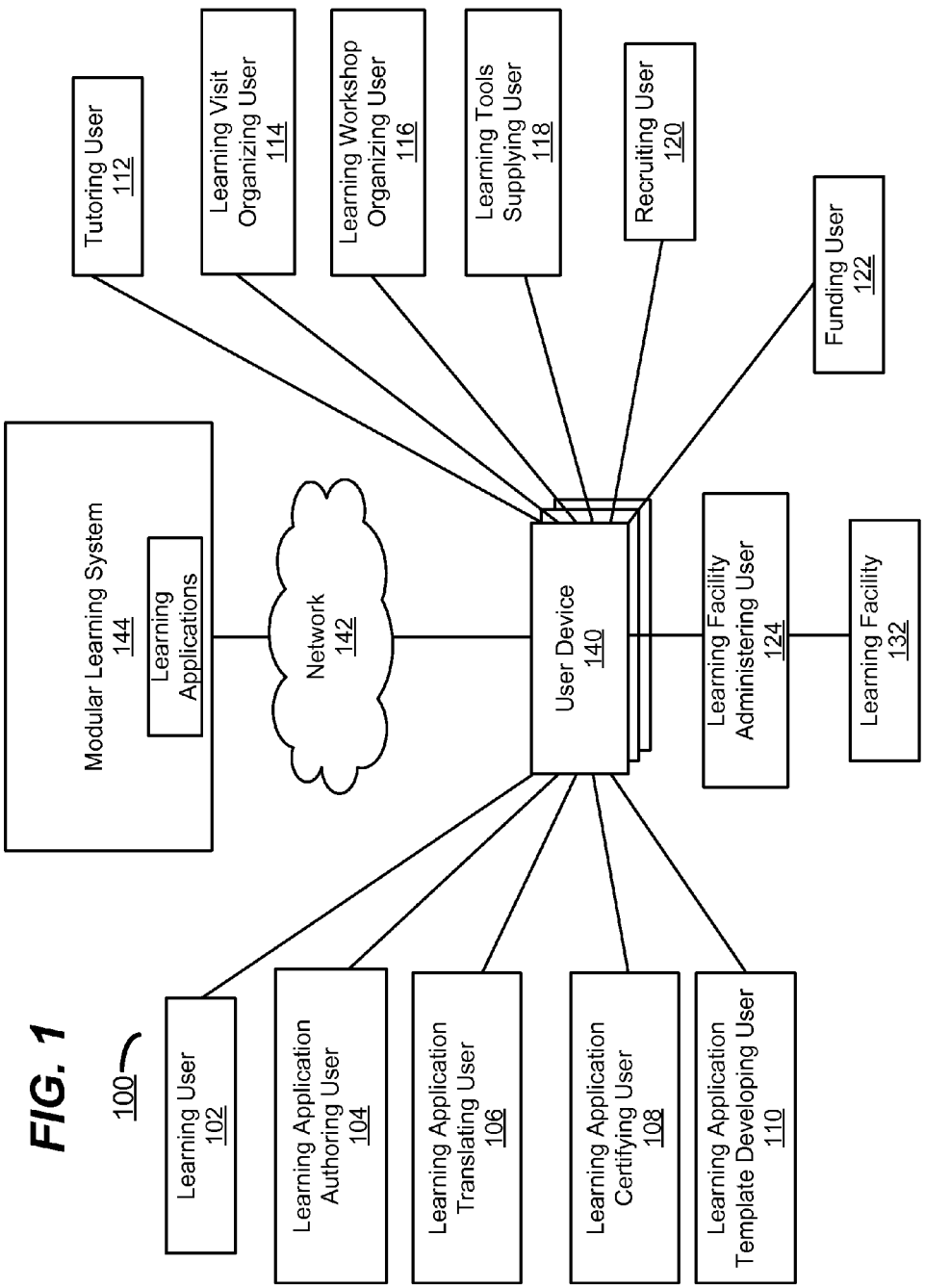
FIG. 1 is a modular learning environment including a modular learning system according to one embodiment.

The Figures (FIGS.) and the following description relate to embodiments by way of illustration only. It should be noted that from the following discussion, alternative embodiments of the systems, methods, figures, diagrams and interfaces disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the systems, methods, figures, diagrams and interfaces illustrated herein may be employed without departing from the principles described herein. In the following description, for the purposes of explanation, numerous specific details are set forth in order to provide a thorough understanding of the various embodiments. It will be evident, however to one skilled in the art that the various embodiments may be practiced without these specific details.

Configuration Overview

A system and method for managing the purchase and performance of a learning application and associated application services stack is provided. A modular learning system 144 stores and manages a plurality of learning applications. For example, a learning application may relate to learning to swim, learning a level of mathematics, or learning a martial art. The learning application may relate to fact-based lesson, such as a history lesson, to a performance-based skill, such as swimming, or to a creative skill such as writing and directing a play. The learning applications comprise learning content and metadata for determining compatibility of the learning application with users and learning services required for performing the learning application. Prior to purchasing and using a learning application, a learning user is verified as compatible for receiving and using the learning application. Learning applications are described in further detail below.

Learning users purchasing a learning application may select learning service providers compatible with the particular learning application in order to learn the content of the learning application. Such learning services may include access to a learning facility, learning tools, learning aids, learning materials, tutoring services, testing services and other services. Each of these learning services may be selected by the learning user 102 and may be provided by a different entity. Each learning application comprises a plurality of kinds of application metadata in addition to the instructional content and associated media for a particular topic or subject. The instructional content and media of each learning application may comprise a specific unit of instruction for a particular portion of knowledge or a skill, and may vary widely in scope. The learning user 102's relationship with the various application service providers is managed through modular learning system 144 with respect to individual learning applications. Each of the learning services is also associated with metadata which may describe aspects of the application services, application service availability, learning users compatible with the application services, schedules, and other aspects of the application services. This metadata relating to the learning services is described in further detail below.

For example, a learning user 102 using the modular learning system 144 may obtain, in micro increments of time and money, tutoring services from a particular tutoring user 112, learning applications from an application authoring user 104, learning tools, aids or materials from a learning tools supplying user 118, learning visits from a learning visits organizing user 114, learning facility access to a learning facility 132, learning workshop access from a learning workshop organizing user 116 and may wish to seek placement or recruitment at another organization through a user registered on the system as a recruiting user 120. The modular learning system 144 enables each of these entities to provide services to the learning user 102 using the learning applications. As such, the modular learning system 144 enables the learning user 102 to identify learning applications the learning user 102 is interested in, and connecting the learning user 102 with application service providers that can provide distinct application services associated with those learning applications.

Figure (FIG. 1) is a modular learning environment 100 including a modular learning system 144 according to one embodiment. Modular learning system 144 operates in modular learning environment 100 and communicates with a plurality of user devices 140 over a network 142. The user devices 140 are operated by a plurality of kinds of users in the learning environment. The user devices 140 may comprise any of a variety of computing devices, such as a desktop computer, a laptop, a mobile device, a tablet computer, a set-top box, a kiosk, interactive television, gaming console, and other computing platforms suitable for communicating with modular learning system 144. The modular learning system 144 provides a system for managing curricula, learning facilities, standardized tests, learning applications, tutors, and other modules of a learning experience in micro increments of time and money. The modular learning system 144 enables the various users to communicate with other users in a learning environment and provide services to learning user 102. The network 142 includes a wireless area network, a local area network, a General Packet Radio Service (GPRS) network, an Enhanced Data for Global Evolution (EDGE) network and the like. The user devices 140 are connected to the modular learning system 144 via the network 142.

Modular learning system 144 allows a learning user 102 to manage the purchase and performance of each module of a single microlearning service stack for a learning application (e.g., Breaststroke) or a group of learning applications (e.g., Breaststroke, Freestyle, Butterfly and Swimming Safety). Tutor access, such as access to a swimming instructor may be purchased in various increments, such as in hours. Learning applications such as a breaststroke application with attached instructional media and other data may be purchased in timed access quantities or may be permanently purchased. Learning facility access such as an Olympic Sized Swimming Pool may be purchased in increments of hours or learning application performances such as ten laps. Learning tools or materials such as Swimming Goggles may be purchased as well. Each of these modules may be separately purchased and interacted with through an interface displayed on user device 140. In case of a learning performance which can be completed on the user device 140 itself, the learning application content is not only purchased and managed, but also performed, through an interface displayed on the user device 140. A learning user 102 may manage the purchase and performance of groups of microlearning performances in the form of learning visits and learning workshops, through an interface displayed on user device 140. Learning user 102 may manage an individual learning identity (or learning profile) and offer details of microlearning application performances completed by the learning user, as well as the personal learning metrics, scores, and reviews. This learning identity may be provided to recruiting users for the purpose of placement.

The modular learning system 144 manages, regulates and supervises the purchase, sale, preview, performance and review of a plurality of microlearning applications, each comprised modularly of a tutoring service, a learning application, learning facility access, and/or learning tools or infrastructure access, a learning visit, and/or a workshop as described in further detail below. The modular learning system 144 manages transactional and functional relationships between users of the modular learning system 144. These various users interact with the modular learning system 144 to modify learning applications and provide learning services as described below.

The modular learning system 144 may enable various other users including but not limited to tutors, authors, tool/material suppliers learning application template developers, translators, certifying user, learning facility administrators, learning event organizers, recruiters, and funders to modularly manage at least one of micro tutoring services associated with specific learning applications, microlearning applications, microlearning application templates, translation of microlearning applications, certification of microlearning applications, access to learning facilities, access to learning workshops, organization of learning visits associated with specific learning applications, supply of tools, aids and/or materials, recruitment services, as well as granular funding services.

The modular learning system 144 enables a tutoring user 112 to provide micro tutoring services to learning user 102. Tutoring user 112 are typically individuals with credentials or other knowledge in the area of learning applications. The tutoring user 112 may associate themselves with particular pieces of content to and may indicate qualifications to teach each learning application, as is described further below. The modular learning system 144 manages the sale of micro tutoring services and associated tutoring user 112 with specific learning applications to learning user 102. Tutoring user 112 assist the learning user 102 with learning the subject matter of the learning application. The tutoring user may provide tutoring to the learning user 102 by meeting the learning user 102 in person to assist the learning user 102 in performing the learning application. As such, the modular learning system 144 facilitates the meeting and communication of tutors and learners. Tutoring user 112 may also provide learning performance data to the modular learning system 144. The learning performance data may indicate, for example, the level of the learner's mastery or proficiency through scoring or other metrics for reviewing performance at a learning performance task. The tutoring user 112 provides input to the modular learning system 144 using a plurality of learning applications through an interface displayed on the tutoring user's 112 user device 140.

The modular learning system 144 enables a learning application authoring user 104 to manage the drafting, editing, testing, publishing, sale and updates of learning content in applications through an interface displayed on user device 140. That is, the learning application authoring user 104 authors individual pieces of learning content which may be purchased and used by a learning user. For example, a learning application authoring user 104 may create instructional content for learning the backstroke. The instructional content may comprise instructions and multimedia, as well as directions for the learning user 102 to practice aspects of the backstroke in a suitable pool. The learning application authoring user 104 may use a pre-existing application template to create the learning application.

The modular learning system 144 enables a learning application template developing user 110 to create learning templates for use in creating learning applications. The learning application templates provide a framework for creating various types of learning applications. For example, learning application templates may comprise a quiz, simulation, role play, experiment, multimedia material, and other types of learning frameworks. The learning application template developing user 110 may manage the development, testing and sale of the learning application templates to learning application authoring users 104 through an interface displayed on a user device 140.

The modular learning system 144 enables a learning application translating user 106 to manage the translation and translation updates of learning content in applications and sale of such services to microlearning application authors through an interface displayed on a user device 140. The translations are provided to the modular learning system 144 and may be stored with the corresponding learning application to enable providing instructions to learning users 102 in a variety of languages.

The modular learning system 144 enables a learning application certifying user 108 to certify various learning applications according to standards applied by the certifying user 108. Such certifying users may include boards of education at various levels, universities, professional standards groups, and other certification authorities. Certifying users 108 may or may not be formal institutions. For example, a certifying user may include a company establishing a set of learning applications to prepare a candidate for a job with the company. The certifying user 108 manages the certification of each learning application as a part of their respective curricula or syllabi and manages the sale of such certification services to learning application authoring users, through an interface displayed on user device 140.

The learning facility 132 facilitates the performance of specific learning applications available on the modular learning system 144. Learning facilities 132 may comprise any location suitable for performing types of learning applications. For example, learning facilities 132 may comprise an athletic club, a chemistry lab, a science lab, a university, a library, or a tutor's home. In some embodiments, the modular learning system 144 enables a facility administering user 124 to determine the compatibility of various learning applications which can be performed within learning facility 132 by picking the learning infrastructure available in the learning facility and associating the learning facility 132 with each learning application (e.g., Breaststroke) compatible with the learning infrastructure (e.g., Olympic sized Swimming Pool). In one embodiment, rather than expressly associating the learning facility with individual learning applications, the learning facility administering user 124 indicates to the modular learning system 144 the specific infrastructures and amenities available at the learning facility 132. In this embodiment, the modular learning system 144 enables a learning user 102 or learning application authoring user 104 to identify a learning facility 132 which is compatible with the learning application based on the infrastructure available at the learning facility 132. The modular learning system 144 may also identify compatible learning facilities based on metadata associated with the learning application and the infrastructure indicated by the learning facility administering user 124.

The learning facilities 132 may comprise a variety of types of learning facilities, such as an independent learning facility, institutional learning facility, workplace learning facility, and temporary learning facility. The modular learning system 144 enables an administrator 124 of an independent learning facility owned, managed or franchised by the modular learning system 144 to manage the sale of learning facility access for performances of specific microlearning applications as well as sale of learning tools and materials (e.g., sulphuric acid or swimming goggles) or access to the same in micro increments of time and money ($six/hour or $five/learning application performance) depending on multiple factors like the learning infrastructure to be accessed (e.g., Swimming Pool, Computers, Chemistry Lab), number of hours of access, and the like, through an interface displayed on a user device 140.

The modular learning system 144 enables an administrator 124 of an institutional learning facility like a preschool, school, college or university (e.g., Bangalore University) associated, partnered or linked with the modular learning system 144 to, in addition to managing the sale associated with the independent learning facility (e.g., learning facility access for performances of specific microlearning applications), manage the learning performances of a plurality of learners (students or outsiders) across a plurality of learning applications available on the system (with the learning user's explicit consent), optionally delegated to a plurality of teachers, professors, lecturers or coaches registered as tutoring users 112 on the modular learning system 144, through an interface displayed on a user device 140.

The modular learning system 144 enables an administrator 124 of a workspace learning facility associated, partnered or linked with the modular learning system 144 to, in addition to managing the sale associated with the independent learning facility (e.g., learning facility access for performances of specific microlearning applications), manage the learning performances of a plurality of learners (employees) across a plurality of learning applications available on the system (with the learning user's explicit consent), optionally delegated to a plurality of Human Resource Managers, Trainers and/or immediate superiors, registered as tutoring users 112 on the modular learning system, through an interface displayed on a user device 140.

The modular learning system 144 enables an administrator 124 of a temporary learning facility (e.g., a Cricket Ground available for net practice on Saturdays and Sundays from six in the morning to twelve in the midnight) to, in addition to managing the sale associated with the independent learning facility (e.g., learning facility access for performances of specific microlearning applications), manage the hours of accessibility to the designated learning facility, through an interface displayed on a user device 140. In addition to managing the sale and performance of microlearning applications, an administrator of an independent, institutional, workspace, or temporary learning facility may manage the modular purchase of learning infrastructure (e.g., chemistry equipment, computers, cricket stumps) as well as learning tools, aids and materials (e.g., sulphuric acid, swimming goggles, cricket bat) from the modular learning system or a third party, topic wise, subject wise, location wise or otherwise based on the learning applications intended to be offered in the designated learning facility, through an interface displayed on a user device 140.

The modular learning system 144 enables a learning visit organizing user 114 to manage the organization of learning visits, and the sale of learning visits to learning users 102. The learning visit organizing user 114 may also associate a learning visit with compatible microlearning applications. Such learning visits may comprise, for example, a visit to a factory or industrial area, a museum, or a trip to a city. The learning visit organizing user 114 may associate the learning visit with learning applications and manage the learning performances during the learning visits. The management of performances of associated learning applications may be optionally provided by tutoring users 112. The learning visit organizing user 114 communicates with the modular learning system 144 through an interface displayed on a user device 140.

The modular learning system 144 enables a learning workshop organizing user 116 to manage the organization of workshops available to learning users 102. A workshop comprises a plurality of specific microlearning applications to be performed in the workshop, and a sequence of the microlearning applications to be performed at the workshop. The workshop may also specify learning tools, a designated learning facility, and a tutoring user or tutoring users to perform the workshop. As such, the workshop user organizes performance and modules of learning applications to be performed together with a group of learning users 102. The learning workshop organizing users 116 also manage the sale of such microlearning workshop access and manage the learning performances for a plurality of learners. The learning workshop organizing users communicate with the modular learning system 144 through an interface displayed on a user device 140.

The modular learning system 144 enables a learning tools supplying user 118 to provide learning tools and materials such as chemicals, biology samples, computer software, and other materials for use with learning applications to learning users 102. The learning tools supplying user 118 manages the organization and sale of the learning tools and materials (or optionally, access to the same) to learning users and administrators of learning facilities 132. The learning tools supplying user 118 may also associate learning tools with particular learning applications stored on modular learning system 144. Alternatively, the learning tools supplying user 118 may designate the tools available and the modular learning system 144 may determine which learning applications may require the tools provided by the learning tools supplying user 118. The learning tools supplying user communicates with the modular learning system 144 through an interface displayed on a user device 140.

The modular learning system 144 enables a recruiter 120 of learning users 102 to manage the recruitment of learning users 102 through the modular learning system 144. The recruiter 120 may view and filter learning users 102 by specific learning applications performed on the system, scores, metrics and reviews generated in relation to the learning applications performed by learning users 102. The recruiter may access and filter learning users 102 based on demographic data like the language used in performing the learning application. Recruiting user 120 may also operate as a certifying user 108 to certify particular learning applications that may be desirable to the recruiting user 120. The recruiting user may use the certified application as a filter prior considering learning users for a position. The recruiting user 120 manages recruiting access to the modular learning system 144 through an interface displayed on a user device 140.

The modular learning system 144 enables a funding user 122 of learning users 102 to provide funding and scholarship funds and other support to learning users 102. Such funding users 122 may comprise a parent, sibling, friend, spouse, relative, university, employer, or scholarship/grant offering institution. The funds may be provided for the funding of specific learning users or of specific learning applications, or of specific microlearning goods and services associated with the specific learning applications, in small increments, through an interface displayed on a user device 140.

Although the modular learning environment 100 is described as being composed of various, user devices (e.g., personal computer), a network (e.g., internet, intranet, world wide web), learning facilities (e.g., an Independent Learning Facility, an Institutional Learning Facility), it would be appreciated by one skilled in the art that fewer or more kinds of users (e.g., a Learning Application Fact Checking User, a Web Based Offsite Tutoring User), user devices (e.g., a mobile phone device, a portable gaming console device, a tablet device, a learning console device, gaming console device or server device attached to a television or other screen), networks (e.g., an intranet at a preschool, school, college, university, educational board, professional standards authority, coaching/tuition class; a social or professional network; an intranet at a company, HR department, training department and at a training organization) and learning facilities may comprise the modular learning environment 100, with the present disclosure still falling within the scope of various embodiments.

Figure 2:
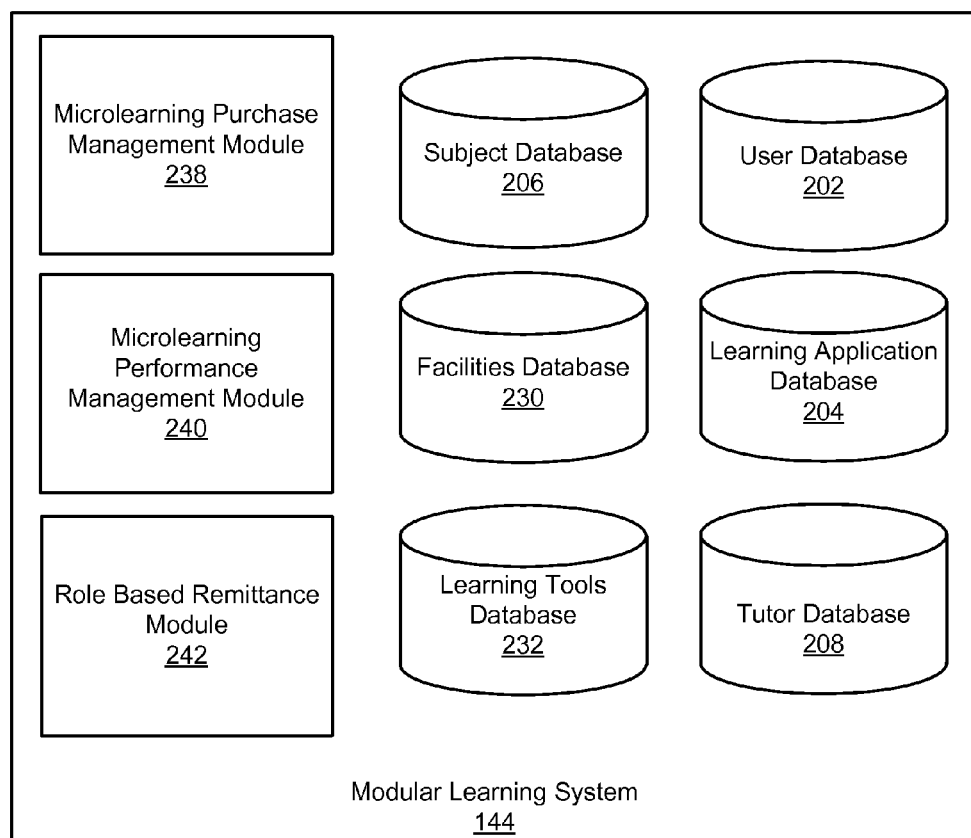
FIG. 2 is a block diagram of a modular learning system according to one embodiment.

FIG. 2 is a block diagram of a modular learning system 144 according to one embodiment. The modular learning system 144 includes a variety of databases and modules for providing learning applications and learning services to users of the modular learning system 144. The modular learning system 144 maintains learning applications in a learning application database 204. The learning applications are sold to users along with microlearning services using the purchase management module 238. Performance of learning applications is enabled by performance management module 240. Additional modules of the modular learning system 144 are described below.

A user database 202 is configured for receiving, storing, updating and retrieving a plurality of data fields of each user, such as the user's name, address, and contact details. Depending on the user's role in the modular learning system 144, the user database 202 maintains additional information on the user. For example, for a learning user 102, the user database 202 maintains learning history outside the modular learning system 144, learning application performance history on the modular learning system 144, purchase history of learning applications as well as purchase history of a host of related microlearning purchase items like, for example, timed access to learning facility 132, timed access to tutor 112, and purchase of access to a learning tool from learning tools database 232. In some embodiments, the data fields are used to determine purchase compatibility using purchase management module 238 and to determine performance compatibility using performance management module 240.

The user database 202 may maintain information about each type of user based on the user's role in the system. The user information may be stored in a plurality of databases, each database associated with a user role, or the user roles may be stored in a single user database 202. For example, the additional user roles include learning application authoring users, learning facility administering users, learning visit organizing users, learning facility administering users, and other types of users of the modular learning system 144.

In one embodiment, a distinct Learning User Database is configured for receiving, storing, updating and retrieving a plurality of data fields of each learning user 102, comprising the learning user's name, address, contact details as well as learning related data fields like learning history outside the modular learning system 144, learning application performance history on the modular learning system 144, purchase history of learning applications as well as purchase history of a host of related microlearning purchase items like, for example, access to learning facility 132, access to tutor 112, and purchase of access to an learning tool. In one embodiment, a distinct Learning Application Authoring User Database is configured for receiving, storing, updating and retrieving a plurality of data fields of each learning application authoring user, say, user 104. In one embodiment, a distinct Independent Learning Facility Administering User Database is configured for receiving, storing, updating and retrieving a plurality of data fields of each independent learning facility administering user, say, user 124. In one embodiment, a distinct Learning Tools Supplying User Database is configured for receiving, storing, updating and retrieving a plurality of data fields of each learning tools supplying user, say, user 118. In one embodiment, a distinct Learning Visit Organizing User Database is configured for receiving, storing, updating and retrieving a plurality of data fields of each learning visit organizing user 114. In one embodiment, a distinct Learning Application Translating User Database is configured for receiving, storing, updating and retrieving a plurality of data fields of each learning application translating user, say, user 106. In one embodiment, a distinct Learning Application Certifying User Database is configured for receiving, storing, updating and retrieving a plurality of data fields of each learning application certifying user, say, user 108. In one embodiment, a distinct Learning Application Template Developing User Database is configured for receiving, storing, updating and retrieving a plurality of data fields of each learning application template developing user, say, user 110. In one embodiment, a distinct Learning Workshop Organizing User Database is configured for receiving, storing, updating and retrieving a plurality of data fields of each learning workshop organizing user, say, user 116. In one embodiment, a distinct Recruiting User Database is configured for receiving, storing, updating and retrieving a plurality of data fields of each recruiting user, say, recruiting user 120. In one embodiment, a distinct Funding User Database is configured for receiving, storing, updating and retrieving a plurality of data fields of each funding user, say, funding user 122.

In one embodiment, a distinct Institutional Learning Facility Administering User Database is configured for receiving, storing, updating and retrieving a plurality of data fields of each, institutional learning facility administering user, say, user 124. In one embodiment, a distinct Workspace Learning Facility Administering User Database is used to is configured for receiving, storing, updating and retrieving a plurality of data fields of each workspace learning facility administering user, say, user 124. In one embodiment, a distinct Temporary Learning Facility Administering User Database is configured for receiving, storing, updating and retrieving a plurality of data fields of each temporary learning facility administering user, say, user 124. In one embodiment, a distinct Learning Facility Database is configured for receiving, storing, updating and retrieving a plurality of data fields of a plurality of kinds of learning facilities, say, facility 132, as received from a plurality of kinds of learning facility administering users, say, user 124. In one embodiment, a distinct Learning Visits Database is configured for receiving, storing, updating and retrieving a plurality of data fields of each learning visit from the respective learning visit organizing user, say user 114. In some embodiments, the data fields of the databases in the above embodiments are used to determine purchase compatibility using purchase management module 238 and to determine performance compatibility using performance management module 240.

The learning application database 204 is configured for receiving, storing, updating and retrieving all the learning application metadata of all learning applications whose purchase is managed through the module 238. Optionally, all purchase related metadata of the learning application, like number of copies accessed per day, segmented by location, language, learning facility, user device, as well as other learning related purchase analytics metadata that may be generated during the purchase process may be received, stored, and updated by the microlearning purchase management module in the learning application database 204.

In one embodiment, the database 204 is configured for receiving, storing, updating and retrieving all the learning application metadata of all learning applications whose performance is managed through the module 240. Optionally, all performance related metadata of the learning application, like number of copies performed per day, segmented by location, language, learning facility, user device, as well as other learning related performance analytics metadata that may be generated during the performance process may be received, stored, and updated by the microlearning performance management module in the learning application database 204.

A subject database 206 is configured for receiving, storing, updating and retrieving a plurality of data fields of each subject linked or tagged to each learning application 300 in Subject Metadata 312. The subject database 206 provides a categorization system for the learning applications and enables learning application authoring users, like user 104, to categorize learning applications as belonging to one or more subjects by associating them with one or more subjects, such subjects then stored in subject metadata 312 of each authored learning application 300. The subject database 206 also allows users to search for learning applications according to particular subjects using the subjects associated with the learning applications. For example, a tutoring user 112 with a mathematics specialty may search the learning applications using the subject database 206 to identify mathematics learning applications for the tutor to associate his services with.

A tutor database 208 is configured for receiving, storing, updating and retrieving a plurality of data fields of each tutoring user, comprising the tutoring user's name, address, contact details, as well as learning related data fields like learning users to whom microlearning services have or are being provided, performance data and performance review data for the tutoring services, tutoring history outside the modular learning system 144, and remittance history. In some embodiments, the data fields are used to determine purchase compatibility using purchase management module 238 and to determine performance compatibility using performance management module 240.

A learning facilities database 230 is configured for receiving, storing, updating and retrieving a plurality of data fields of a plurality of kinds of learning facilities such as learning facility 132 as received from learning facility administering users 124. In some embodiments, the data fields are used to determine purchase compatibility using purchase management module 238 and to determine performance compatibility using performance management module 240.

A learning tools database 232 is configured for receiving, storing, updating and retrieving a plurality of data fields of each learning tool or material from each learning tools supplying user 118. In some embodiments, the data fields are used to determine purchase compatibility using purchase management module 238 and to determine performance compatibility using performance management module 240.

Each of these databases, such as the tutor database 208, facilities database 230, and learning tools database 232, may also include information relating to purchase and performance compatibility. For example, a tutor in the tutor database may specify the tutor is only willing to teach students aged thirty to forty, or a learning facility may indicate it is only willing to allow entry to learning users who are a member of the facility.

A purchase management module 238 is configured for managing the purchase of learning applications and associated application services as a microlearning stack by the learning user 102.

A performance management module 240 is configured for managing the performance of learning applications and associated application services as a microlearning stack by the learning user 102.

A remittance module 242 is configured for managing role based modular remittances in a modular learning system environment. The remittance module 242 receives and processes learning application purchase requests from learning users. Each learning application is associated with a service charge and a remitted user who will receive the service charge based on a remittance cycle. The remittance module 242 processes each learning application transaction by subtracting the service charge for the application from an account balance of the learning user, and remitting the service charge to the remitted user on a date specified by the remittance cycle. In one embodiment, the remittance module 242 aggregates all service charges associated with a remitted user before delivery on the date specified by the remittance cycle.

In one embodiment, the tutor database, learning facilities database, tools database and other application services databases form a single consolidated application services database in modular learning system 144.

Although the modular learning system 144 is described as being composed of various components like databases and modules, the modular learning system 144 may comprise fewer or more databases, components, and other modules. For example, the modular learning system 144 may include a Learning Application Genre Database, a Locational Learning Facility Price Range Database, a Learning Workshop Database, a Multilingual Dictionary Database, a Concept Tags Database, a Learning Objectives/Outcomes Database, a Micro tutoring Services Database, and a Skill and Ability Tags Database. The modular learning system 144 may also include an Age Compatibility Module, a Learner Ranking Module, a Tutor Ranking Module, a Learner Billing Module, a Tutor Remittance Module, a Profile Management Module, a User Roles Management Module, a Learning Tools Management Module, a Learning Facility Management Module, Metadata Management Module, a Notification Module, a Recruitment Module, a Funding Module, a Map Module, a Learning Application Template Programming Interface Module, an Age Compatibility Module or a Translation Interface Module, with the present disclosure still falling within the scope of various embodiments. In some embodiments, an individual or group may play a plurality of user roles on the modular learning system, (e.g., tutoring user learning new applications as a learning user through another tutoring user, a learning application authoring user translating the authored application or developing the application template), with the present disclosure still falling within the scope of various embodiments.

In various embodiments the modular learning system 144 may be any of a web application, a mobile application, or an embedded module or subsystem of a social networking environment, a learning content management system, a learning management system, a professional networking environment, an electronic commerce system, an electronic payments system, a mobile operating system, a computer based operating system, or of a tablet based operating system, with the present disclosure still falling within the scope of various embodiments.

In one embodiment, a distinct roles management module is configured for managing and authorizing different roles associated with the various users of the modular learning system 144 and in the respective user databases. For example, the roles management module may provide distinct feature tabs and functionalities to each user based on the role associated with him or her. It can be noted that, the roles management module may enable a user to have one or more roles for accessing the modular learning system 144. For example, a tutoring user can avail the functionality and interface tabs of a learning user and also of a translating user if authorized by the modular learning system 144.

In one embodiment, a distinct metadata management module is configured for managing metadata associated with a plurality of specific learning applications, like learning application 300. In one embodiment, the metadata management module is configured for receiving, storing, updating and retrieving various types of metadata associated with each learning application 300 in the learning application database 204. In another embodiment, the metadata management module is configured for receiving and storing updated metadata of a specific learning application 300 in database 204 at regular intervals of time as updated by different users in authorized user roles and retrieving the required metadata when requested by the purchase management module 238 and the performance management module 240 for determining compatibility and performance compatibility of requested microlearning service stack respectively. In yet another embodiment, the metadata management module enables various users of the modular learning platform to update metadata associated with specific learning applications in the learning application database according to their user role.

It is appreciated that, in some embodiments, various databases like 202, 204, 206, 208, 230, and 232, modules 238,240 and 242 as well as the databases, engines, modules and components of the above embodiments may be stored in the form of machine readable instructions in the memory of the modular learning system 144 and executed by a processor of the modular learning system 144 to perform one or more embodiments disclosed herein. Alternatively, the various databases like 202, 204, 206, 208, 230, and 232, modules 238,240 and 242 as well as the databases, engines, modules and components of the above embodiments may be implemented in the modular learning system in the form of an apparatus configured to perform one or more embodiments disclosed herein.

Figure 3A:
FIG. 3A is a block diagram of a learning application according to one embodiment.

FIG. 3 is a block diagram of a learning application 300, according to one embodiment. Each learning application 300 comprises a plurality of kinds of application metadata in addition to the instructional content and associated media for a particular topic or subject. The instructional content and media of each learning application 300 may comprise a specific unit of instruction for a particular portion of knowledge or a skill, and may vary widely in scope. The learning application 300 may be very narrow in scope, such as "treading water" or may be broad in scope, such as "overview of world history", depending on the authoring process of learning application authoring user 104. The learning application 300 could indicate a theoria (to think, a theory based application using primarily memory, reasoning, logic) performance type or a praxis performance type (to do, a practical performance type or a poeisis performance type). The learning application 300 may comprise metadata indicating associated application services for purchasing or performing the learning application 300 like tutor metadata 336, tools metadata 322 and learning facility metadata 316. In one embodiment, the learning application 300 may be requested for purchase or performance with associated application services as a microlearning service stack, wherein the application services comprise of access to tutoring user 112, access to a learning tool from learning tools database 232 and access to a learning facility from facilities database 230. For example, the media metadata 326 of a learning application 300 provided by learning application authoring user 104 may specify instructions for learning how to swim a breaststroke, but the media metadata 326 does not typically specify individual pools i.e. learning facilities to perform the learning application or tutors to coach and review the performance. Rather, the application services metadata like tutor metadata 336, tools metadata 322 and learning facility metadata 316 indicates tutors, tools, and facilities which the learning user may choose to perform the learning application's instructions.

The Certification Metadata 302 is used to receive, store, retrieve, display and update certification history as well as live certifications of the learning application 300, including, for example, a certification from educational board 108 and another educational board in another state, present as a certifying user in database 202 or a distinct certifying user database. In some embodiments, the certification metadata is also used to determine purchase compatibility in the microlearning purchase management module 238 through learning application database 204 and to determine performance compatibility in the microlearning performance management module 240 through learning application database 204.

The Scoring Metrics Metadata 304 is used to receive, store, retrieve, display and update a plurality of metrics for quantitative and qualitative scoring as defined and updated for learning application 300 by learning application authoring user 104. In some embodiments, the quantitative scoring of each metric is conducted during the performance by a dedicated module within the learning application 300 itself, while in other embodiments of a performance, especially a non-screen based praxis or poeisis performance, the quantitative and optionally, qualitative score for each metric is received through a user device 140 from the learning user 102 and/or the tutoring user 112. In some embodiments, the scoring metrics metadata is also used to determine purchase compatibility in the microlearning purchase management module 238 through learning application database 204 and to determine performance compatibility in the microlearning performance management module 240 through learning application database 204.

The Language Metadata 306 is used to receive, store, retrieve, display and update a plurality of translations of all user viewable application metadata for learning application 300 translated by, for example, learning application translating user 106 into Bengali, comprising of media metadata 326 like instructional text, subtitles to audio and video instructions, and all other linguistic content for the preview, performance and review of learning application 300 by learning user 102 and preview and review of the learning performance by tutoring user 112. In some embodiments, metadata 306 further comprises translations in at least one other language, of performance type metadata 308, duration metadata 310, subject links and tags metadata 312, age level metadata 314, learning facility metadata 316 authoring metadata 318, sequence metadata 320, tool metadata 322, mode metadata 324, medium metadata 328 and job skill metadata 330. In some embodiments, the language metadata is also used to determine purchase compatibility in the microlearning purchase management module 238 through learning application database 204 and to determine performance compatibility in the microlearning performance management module 240 through learning application database 204.

The Performance Type Metadata 308 is used to receive, store, retrieve, display and update the performance type of the learning application 300. For example, the metadata 308 could indicate a theoria (to think, a theory based application using primarily memory, reasoning, logic, like a 'Biomechanics of Swimming' Pop Quiz) performance type or a praxis performance type (to do, a practical performance type like an 'eight hundred meter Freestyle Swim as per Olympic performance guidelines' or a poeisis performance type (to make, a creation oriented performance type like a 'five minute Synchronized Swimming Choreography'), such that the learning user is already aware of the task or performance type before purchasing and performing the learning application 300. In some embodiments, the performance type metadata is also used to determine purchase compatibility in the microlearning purchase management module 238 through learning application database 204 and to determine performance compatibility in the microlearning performance management module 240 through learning application database 204.

The Duration Metadata 310 is used to receive, store, retrieve, display and update the suggested duration of the learning application 300. In some embodiments, the metadata 310 indicates a fixed duration like, fifteen minutes, or thirty minutes, or one hour, while in other embodiments, the metadata indicates a variable duration with, optionally, a predetermined minimum or maximum duration depending on the duration metadata set by the learning application authoring user 104. In some embodiments, the duration metadata is also used to determine purchase compatibility in the microlearning purchase management module 238 through learning application database 204 and to determine performance compatibility in the microlearning performance management module 240 through learning application database 204.

The Subject Metadata 312 is used to receive, store, retrieve, display and update a plurality of subject links and tags attached to the learning application 300 by the learning application authoring user from among the subject links and tags present in the Subject Database 206. In some embodiments, the subject links and tags are attached to specific concepts or terms within the Media Metadata 326. In some embodiments, the subject link/tag metadata is also used to determine purchase compatibility in the microlearning purchase management module 238 through learning application database 204 and to determine performance compatibility in the microlearning performance management module 240 through learning application database 204.

The Age Level Metadata 314 is used to receive, store, retrieve, display and update the suggested age level of the learning user 102 for performance of the learning application 300. In some embodiments, the age level is set as a minimum suggested age say, for example, over ten years old, by the learning application authoring user 104. In other embodiments, a range of suggested learner ages is set by the learning application authoring user 104. In some embodiments, the age level metadata is also used to determine purchase compatibility in the microlearning purchase management module 238 through learning application database 204 and to determine performance compatibility in the microlearning performance management module 240 through learning application database 204.

The Learning Facility Metadata 316 is used to receive, store, retrieve, display and update the suggested learning infrastructure required in a learning facility for performance of the learning application 300. In some embodiments, such learning facilities and infrastructure (e.g., Olympic Sized Swimming Pool) required for the performance of the learning application (e.g., eight hundred meter Freestyle to Olympic Guidelines) is received and updated by the learning application authoring user 104 by picking the same from a learning facilities database 230 available on the modular learning system 144. In other embodiments the metadata 316 is received and updated by the administering user 124 of learning facility 132. In some embodiments, the learning facility metadata is also used to determine purchase compatibility in the microlearning purchase management module 238 through learning application database 204 and to determine performance compatibility in the microlearning performance management module 240 through learning application database 204.

The Authoring Metadata 318 is used to receive, store, retrieve, display and update the authoring metadata received by the learning application author 104, including for example the name, signature, contact details, intellectual property disclaimer and other information of the user or user group. In some embodiments, the metadata also includes metadata generated by the modular learning system 144 during the authoring user's editing process, including the version history, tracked changes and time stamps of edits and updates to the learning application. In some embodiments, the metadata may also include citations to other learning applications or other learning application authoring users made by the user 104.

The Sequence Metadata 320 is used to receive, store, retrieve, display and update the suggested sequence of performance of the learning application 300 relative to another learning application. The sequence metadata may indicate if the learning application should be performed before, after, instead of, or with another learning application by learning application authoring user 104. The user 104 may wish for any learning user, say 102 to perform an advanced microbiology learning application 300 only after performing a corresponding beginner's microbiology learning application, irrespective of the learning user's age or quality of performance. In other embodiments, wherein the learning application authoring user is not the author of the suggested beginner's application, the user 104 may input a sequence suggesting to the learning user 102 to perform the learning application before or after a learning application authored by another learning application authoring user. In some embodiments, the sequence metadata is also used to determine purchase compatibility in the microlearning purchase management module 238 through learning application database 204 and to determine performance compatibility in the microlearning performance management module 240 through learning application database 204.

The Tool Metadata 322 is used to receive, store, retrieve, display and update the compatible tools or learning materials to the learning application 300. In some embodiments, the tool compatibility is received from and updated by the learning application authoring user 104 by accessing the tool database 232. In other embodiments, the tool compatibility is received and updated by the learning tools supplying user 118 by accessing the learning application database 204. In still other embodiments, the tool compatibility may be updated by the modular learning system 144. In some embodiments, the tool metadata is used to determine purchase compatibility in the microlearning purchase management module 238 through learning application database 204 and to determine performance compatibility in the microlearning performance management module 240 through learning application database 204. In some embodiments, wherein the learning tool is a peripheral input device which can be connected to the user device 140 during the learning application performance (e.g., Electric Guitar attached to a user device 140 during an 'Introduction to Hard Rock' learning application) the Tool Metadata includes the compatibility to the user device 140. In other embodiments, wherein the learning material is not material to the user device 140, (e.g., Sulphuric Acid during a Chemistry Experiment) the Tool Metadata may not include any additional user device compatibility.

The Mode Metadata 324 is used to receive, store, retrieve, display and update the available modes of performance of the learning application. In some embodiments, the mode metadata is determined by the modes chosen by the learning application authoring user from the learning application template chosen. In various embodiments, the learning application may comprise an individual learner performance mode, a learner plus learner cooperative performance mode, a learner versus learner competitive performance mode, a learner plus tutor cooperative performance mode, a learner versus tutor competitive performance mode, a limited plurality of learners (e.g., four learners) cooperative performance mode, a limited plurality of learners (e.g., four learners) competitive performance mode, a tutor plus limited plurality of learners (e.g., nine learners) cooperative performance mode (a typical classroom mode). Although the Mode Metadata is described as being composed of various available modes as chosen by the learning application authoring user, various other modes (e.g., a limited plurality of learners vs. a limited plurality of learners competitive performance mode) may comprise the Mode Metadata 324 and still fall within the scope of various embodiments. In some embodiments, the various Media Metadata for the preview, performance and review screens for each mode of the same learning application and the sequence of the same (especially wherein the learning application 300 is performed by multiple users from the same user device and, optionally, by viewing the same display device) is received, stored, retrieved, displayed and updated in the Media Metadata 326. In some embodiments, the mode metadata is also used to determine purchase compatibility in the microlearning purchase management module 238 through learning application database 204 and to determine performance compatibility in the microlearning performance management module 240 through learning application database 204.

The Media Metadata 326 is used to receive, store, retrieve, display and update text, image, audio, video, animation, links and other interactive elements of the learning application as received and updated by the learning application authoring user 104 during the publishing and revision of the learning application 300. In other embodiments, the learning application Media Metadata may comprise the theoria, praxis or poeisis task or, optionally, plurality of tasks to be completed during the performance, their sequence, and, optionally, the learning outcomes and objectives of the same. In some embodiments, the media metadata is also used to determine purchase compatibility in the microlearning purchase management module 238 through learning application database 204 and to determine performance compatibility in the microlearning performance management module 240 through learning application database 204.

The Medium Metadata 328 is used to receive, store, retrieve, display and update the medium of access to the learning application preview, review and performance screen during the microlearning performance. For example, for a Beginner's Kathak Dancing microlearning Application, in addition to requiring a compatible learning facility and tutoring user, the learning application authoring user 104 or, optionally, modular learning system 144 may require the preview and review screen to be viewable only on a display device connected to a learning console user device or the display device of a computer device but not a mobile device screen to ensure an optimum learning experience. In another case, for a Kathak Quiz microlearning application, the learning application authoring user 104 or, optionally, modular learning system 144 may require the performance screen, preview screen and review screen to be viewable only on a mobile device screen but not on a display device connected to a learning console user device, or the display device of a computer device. In some embodiments, the medium metadata may further comprise the compatibility to a plurality of software platforms and, optionally, runtime environments as determined by the modular learning system 144. In some embodiments, the medium metadata is also used to determine purchase compatibility in the microlearning purchase management module 238 through learning application database 204 and to determine performance compatibility in the microlearning performance management module 240 through learning application database 204.

The Job Skill Metadata 330 is used to receive, store, retrieve, display and update the skills and abilities tagged to the learning application 300 by the learning application authoring user 104, the recruiting user 120 or, optionally, the modular learning system 144 from a skills and abilities database provided by the modular learning system 144. In some embodiments, the metadata is used by a recruiting user 120 to post the completion of the learning application (optionally, in a controlled testing environment) or group of applications as a minimum requirement for a particular job role to a plurality of potentially employable learning users. In other embodiments, the metadata is used by the recruiting user 120 to post the requirement of completion of the learning application 300 (optionally, in a controlled testing environment) or group of applications as a minimum requirement for a promotion to a higher post in a particular organization, to a plurality of potentially employable learning users. In some embodiments, the job skill metadata is also used to determine purchase compatibility in the microlearning purchase management module 238 through learning application database 204 and to determine performance compatibility in the microlearning performance management module 240 through learning application database 204.

The Error Metadata 332 is used to receive, store, retrieve, display and update the potential errors which can be made by the learning user 102 (e.g., ten potential errors in an auditing microlearning application), as determined by the learning application authoring user 104. In some embodiments, wherein the learning application (e.g., a Karnataka History Quiz) is performed through an input device on a user device 140 itself, the error metadata may be synchronized to each potential input point during the learning application 300 performed through the user device 140 by the learning application authoring user 104. In some embodiments, wherein the learning application (e.g., a Karate kata) 300's error metadata is outside the recordable boundaries of the user device 140, the potential errors may be entered with reference to each instructional step of the performance by the learning application authoring user 104, such that at the time of the performance, the tutoring user (or, in some modes, the learning user 102 himself, another learning user, or the recruiting user 120) may note errors in each observable step of the performance and confirm the same on user device 140 to generate the score. In other embodiments, wherein the error observed by the observing user (say, tutoring user 112) is not part of the potential errors in the Error Metadata 332 of the application 300, the tutoring user 112 may update such errors to the Errors Metadata, or optionally, send the same to the learning application authoring user 104, to be updated after review. In some embodiments, the error metadata is also used to determine purchase compatibility in the microlearning purchase management module 238 through learning application database 204 and to determine performance compatibility in the microlearning performance management module 240 through learning application database 204.

The Template Metadata 334 is used to receive, store, retrieve, display and update the default script, formatting and media modules of the learning application template used to author the learning application 300. In some embodiments, wherein a particular sequence and format of the same has been chosen by the learning application authoring user from the options offered in the template developed by the learning application template developing user, the chosen setting may be a part of the Template Metadata 334. In various embodiments, the learning application templates may comprise a quiz, role play, simulation, project, experiment, essay, recital, research paper, race, challenge, problem, game, question, exercise or problem set. In some embodiments, the templates may be for performances conducted and supervised in front of a display device with an input device connected to the user device 140, while in other embodiments the templates may be for previews, reviews and guidelines for performances conducted without the input device, with the user device 140 merely placed next to the performance area or learning station (e.g., for Praxis Tasks in Dance Applications) as a reference point. Although the Template Metadata is described as being composed of various available templates as developed by the learning application template authoring user and chosen by the learning application authoring user, various other templates (e.g., a Swimming Race Template, a Patent Drafting Template) may comprise the Template Metadata 334 and still fall within the scope of various embodiments. In some embodiments, the template metadata is also used to determine purchase compatibility in the microlearning purchase management module 238 through learning application database 204 and to determine performance compatibility in the microlearning performance management module 240 through learning application database 204.

The Tutor Metadata 336 is used to receive, store, retrieve, display and update the compatibility of tutoring users to learning application. In some embodiments, the tutoring user compatibility is received from and updated by the tutoring user 112 by updating the tutor database 208 (e.g., a Mathematics Tutoring User whose medium of instruction is Mandarin updating compatibility to a plurality of Mathematics microlearning applications available in Mandarin, in the tutor database 208). In other embodiments, the tutoring user compatibility metadata is received from and updated by the tutoring user 112 by accessing the learning application database 204. In still other embodiments, the tutoring user compatibility metadata may be updated by the modular learning system 144. In some embodiments, the Tutor Metadata is also used to determine purchase compatibility in the microlearning purchase management module 238 through learning application database 204 and to determine performance compatibility in the microlearning performance management module 240 through learning application database 204.

In various embodiments, the metadata of learning application 300 is retrieved, displayed to and updated by a plurality of kinds of users as may be applicable to the kind of metadata and the kind of user. Optionally, in addition to receiving and storing the metadata, the modular learning system 144 may update the learning application metadata as and when generated in the system through a dynamic metadata update module or through a dedicated administering user. In some embodiments, the learning application authoring user 104 may further play the role of the learning application template developing user. In some embodiments, the modular learning system 144 may play the role of the learning application authoring user 104 and, optionally, the role of the learning application template developing user 110 to author and update the media and template metadata of the learning application 300.

In some embodiments, the microlearning purchase management module 238 and microlearning performance management module 240 retrieve some or all of the above metadata associated with the learning application 300 from a learning application database 204 in a repository module of the modular learning system 144.

In some embodiments, the media metadata 326 of the learning application may comprise an electronic textbook, an electronic journal, an instructional video, or an instructional animation. In some embodiments each learning application 300, may be a distinct mobile application, browser based web application, or a desktop application. In some embodiments, each learning application 300 may be an executable file, a program, add in, macro, plug-in, or other program of instructions associated with a plurality of application programming interfaces of the modular learning system 144.

Although the learning application 300 is described as comprising various metadata and associated data fields stored and updated in learning application database 204, fewer or more metadata and associated data fields (e.g., Application Programming Interface Metadata, Organization versus Organization Social Learning Mode Metadata, University versus University Social Learning Mode Metadata, Testing Metadata, Learning Visits Metadata, Learning Workshops Metadata, Tutorials Metadata) may comprise the Learning Application 300 and associated learning application database 204, with the present disclosure still falling within the scope of various embodiments. In some embodiments, each version of the same learning application 300 with different metadata, for example language metadata, is treated as a distinct learning application in learning application database 204.

In some embodiments, an authorization to update certification metadata 302 of a learning application 300 is limited to a predetermined plurality of certifying users like user 108 and recruiting users like user 120. In some embodiments, an authorization to update scoring metrics metadata 304, performance type metadata 308, age level metadata 314, authoring metadata 318, mode metadata 324, media metadata 326, medium metadata 328, and error metadata 332 of a learning application 300 is limited to a predetermined plurality of learning application authoring users like user 104. In some embodiments, an authorization to update language metadata 306 of a learning application 300 is limited to a predetermined plurality of learning application translating users 106. In some embodiments, an authorization to update duration metadata 310 of a learning application 300 is limited to a predetermined plurality of learning application authoring users like user 104 and learning application template developing users like user 110. In some embodiments, an authorization to update subject link/tag metadata 312 of a learning application 300 is limited to a predetermined plurality of users in any user role. In various embodiments, such authorizations may be set by an administrator of system 144 based on the user role, user profile information and user preferences information of the corresponding users.

In some embodiments, an authorization to update learning facility metadata 316 of a learning application 300 with associated learning facilities is limited to a predetermined plurality of learning facility administering users like user 124. In some embodiments, an authorization to update sequence metadata 320 of a learning application 300 is limited to a predetermined plurality of learning application authoring users like user 104 and tutoring users like user 112. In some embodiments, an authorization to update tool metadata 322 of a learning application 300 with associated learning tools is limited to a predetermined plurality of tool supplying users like user 118. In some embodiments, an authorization to update job skill metadata 330 of a learning application 300 is limited to a predetermined plurality of recruiting users like user 120. In some embodiments, an authorization to update template metadata 334 of a learning application 300 is limited to a predetermined plurality of learning application authoring users like user 104 and a predetermined plurality of template developing users like user 110. In some embodiments, an authorization to update tutor metadata 336 of a learning application 300 with associated tutoring services is limited to a predetermined plurality of tutoring users like user 112. In some embodiments, an authorization to update an optional learning event metadata of a learning application 300 with associated learning workshops, visits and other learning events is limited to a predetermined plurality of learning workshop organizing users like user 116 and learning visit organizing users like user 114. In some embodiments, the associations of application services to learning applications are enabled automatically by a metadata association module in the system 144. In some embodiments, each learning application 300 is associated with a subset of learning facilities in a learning facilities database 230. In some embodiments, each learning application 300 is further associated with a subset of learning stations of each associated learning facility. In some embodiments, each learning application is associated with a subset of tutors in a tutor database 208. In some embodiments, each learning application is associated with a subset of tools in a learning tools database 232.

Figure 3B:
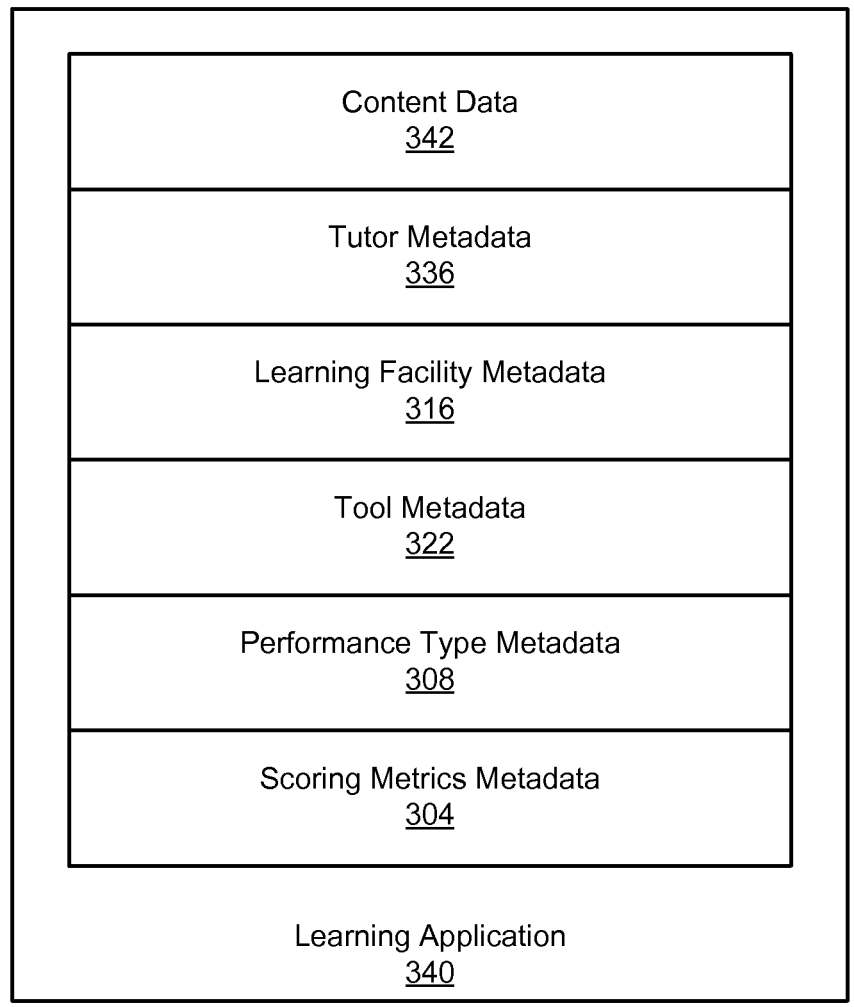
FIG. 3B is a block diagram of a learning application according to an alternative embodiment.

FIG. 3B is a block diagram of a learning application 340 according to another example embodiment. The learning application 340 is illustrated to depict metadata of the learning application related to a microlearning service stack. The learning application 340 also illustrates some other performance data used during its performance by a learner. This microlearning service stack may be requested for purchase or performance by learning user 102. In this embodiment, the microlearning service stack includes a learning application 340, a time based tutoring service by a particular tutor in database 208, time based access to a particular learning facility from database 230, and access to a particular tool from database 232. The particular services above may or may not be associated with the corresponding tutor metadata, facilities metadata, and tool metadata of learning application 340 at the time of a request. The learning application 340 includes content data 342 which designates particular content media and content attributes of the learning application 340. The learning application also includes other metadata as described above, such as tutor metadata 336, learning facility metadata 316, learning tool metadata 322, performance type metadata 308, and scoring metrics metadata 304. As such, the learning application 340 illustrates some aspects of the learning application used for purchase or performance of the learning application 340 by a learner as part of a microlearning service stack, such as content, tutors, facilities, and tools. The learning application 340 may also include any other metadata as described above with reference to FIG. 3A. Any other metadata as described above with reference to FIG. 3A may also be part of the content data 342 of the learning application 340.

The lifecycle of a learning application 300 is now described according to one embodiment. Initially, a learning application template developing user 110 creates a learning application template stored in a distinct template database in a modular learning system 144. Next, the learning application authoring user 104 publishes learning application content stored as media metadata of the learning application 300. In case a template has been chosen for the application 300, the template metadata is stored as well. The tutor metadata, learning facility metadata, learning tool metadata and other optional application services metadata indicating tutoring services, learning facilities, learning tools, and other application service types associated with the learning application 300 are dynamically updated by the corresponding tutoring users, learning facility administrators, tool suppliers and other application service providers. At this point, the learning user may modularly select application services in a microlearning stack to purchase or perform the learning application. Next, the learning user 102 selects the learning application 300 and identifies application services requested for purchase or performance as a consolidated stack. The approval of the purchase or performance request for learning application 300 and particular application services in the microlearning service stack may be determined by the specific metadata of the learning application 300 being associated with corresponding application services, and other specific metadata of the learning application being compatible with the profile information and preferences of the learning user.

Figure 4:
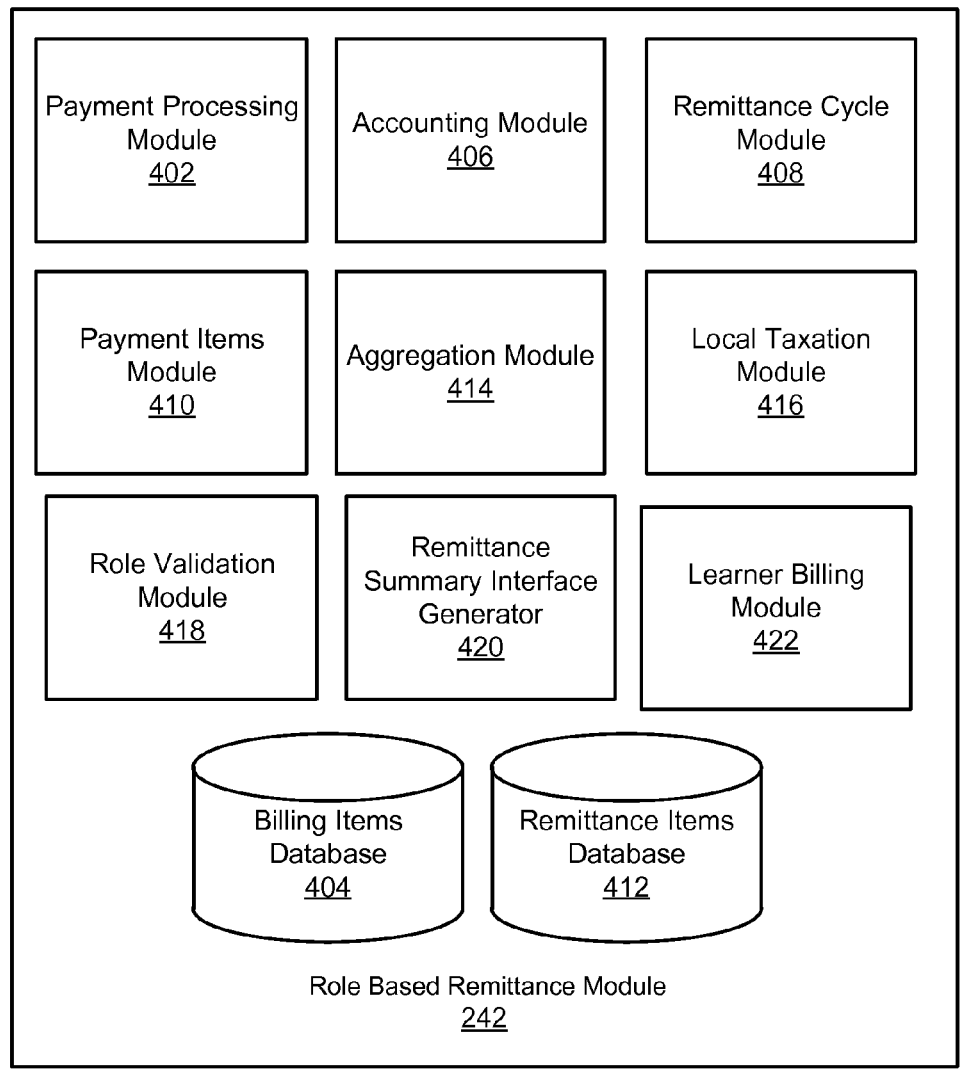
FIG. 4 is a block diagram of a role based remittance module according to one embodiment.

FIG. 4 is a block diagram 400 of the role based remittance module 242. The payment processing module 402 is configured for retrieving the adjusted net aggregate remittance amount for each unique remittance item and processes a plurality of remittance transactions for each of a plurality of remitted users at predetermined points in time based on the remittance cycle of the remitted user. The billing items database 404 is configured for receiving, storing, retrieving and updating a plurality of billing items accessed from the learner billing module 422 and, optionally, an intra-system purchase management module for each learning application, application service, microlearning event or, optionally, intra-system service purchase item billed to a plurality of learning users in user database 202 and, optionally, a plurality of otherwise remitted users in the corresponding databases of the modular learning system 144. In an embodiment, the remitted user may be a tutoring user, a learning application authoring user, a learning facility administrating user, a microlearning event organizing user, a learning application translating user, a learning application template developing user, and a learning tool supplying user The accounting module 406 is configured for receiving, storing, retrieving and updating a plurality of billing items, remittance items, payment terms items, local taxation items, and aggregate remittance amount items as well as, optionally, a plurality of purchase items for intra-system purchases conducted by each remitted user. The accounting module 406 organizes the items into the remittance account summary for the period of the remittance cycle of the remitted user. The accounting module 406 then generates the corresponding account summary interface items for each item received and stored from the plurality of modules for each remitted user.

The remittance cycle module 408 is configured for receiving, storing, retrieving and updating a remittance cycle item with a plurality of particulars like a start date, an end date, duration, as well as a plurality of other particulars for each remitted user and corresponding user role in corresponding databases of the modular learning system 144. In various embodiments, the remittance cycle module 408 determines the subset of the plurality of billing items generated for each remitted user which are remittable in a given remittance cycle and requests the remittance summary interface generator 420 to display the updated remittance summary to each remitted user at a predetermined date and time before the end of the next remittance cycle. In some embodiments, the remittance cycle and corresponding particulars are chosen or filled in input areas of a preferred remittance cycle interface by each remitted user on remitted users' user devices 140 before the beginning of the first remittance cycle, while in other embodiments, the remittance cycle of each remitted user may be determined by the modular learning system 144. In some embodiments, the remittance cycle of each remitted user in a particular user role may be the same in case the modular learning system 144 stores a common remittance cycle item for each of a particular kind of remitted user role on the modular learning system 144. In such embodiments, the role validation module 418 and the remitted user's corresponding database on the modular learning system 144 is accessed by remittance cycle module 408 while generating a remittance cycle item for each such remitted user in the user role or plurality of user roles.

The payment terms module 410 is configured for receiving, storing, retrieving and updating a plurality of payment terms for each of a plurality of kinds of billing items billed to each remitted user or kind of user role, as received from the modular learning system 144. In some embodiments, such payment terms items are retail margins, service charges and other items charged to the remitted user on each billing item in each remitted user's remittance cycle. In embodiments wherein the modular learning system 144 stores a unique payment term for each billing item billed to all remitted users in a given user role, the payment terms items module may access the role validation module 418 and the remitted users' corresponding databases on the modular learning system 144 while generating the payment terms item or plurality of items for the remitted user before generating the same in a given remittance cycle.

The remittance items database 412 is configured for generating, storing, retrieving and updating a plurality of remittance items for each unique remittance transaction conducted by or through the modular learning system 144 for each learning application, application service or microlearning event purchased by each learning user in user database 202 of the modular learning system 144 from one of a plurality of learning application authoring users, tutoring users, learning facility administering users, learning tools supplying users, and learning event organizing users. In various embodiments, each remittance item may involve the remittance of a plurality of corresponding billing items present in the billing items database 404 and aggregated by aggregation module 414 for predetermined periods of time as predetermined or preferred for the remitted user in remittance cycle module 408. In some embodiments, the remittance item may be generated for a transaction occurring between two kinds of users ordinarily considered remitted users when the learning user purchases their learning products or services from the marketplace on the modular learning system 144. For example, the remittance module 242 may receive a billing item in billing items database 404 for a purchase made by a learning facility administering user 124 of learning tools from learning tools supplying user 118 to offer for rent in the user 124's independent learning facility 132 to a plurality of learning users on the modular learning system 144. In another example, a microlearning workshop organizing user 116 may purchase tutoring services of the tutoring user 112 as part of the microlearning workshop organized for learning users in database 202 with the corresponding billing item being received by billing items database 404 from the intra-system purchase management module of the modular learning system 144. In such embodiments, the corresponding remittance item may be generated for the remittance cycle by aggregating the plurality of billing items generated through learning products and services billed to learning users in user database 202 as well as a plurality of other kinds of users from the corresponding databases in system 144 by the aggregation module 414, by accessing the same from the billing items database 404.

The aggregation module 414 is configured for aggregating the plurality of billing items for a given remittance cycle of a remitted user in the modular learning system 144 by accessing the remittance cycle for the remitted user from the remittance cycle module 408 and accessing the plurality of billing items for the remittance cycle from billing items database 404. In some embodiments, if a payment term like a margin or service charge is charged by the modular learning system 144 and which is to be deducted from one or a plurality of billing item amounts for the remittance cycle, the aggregation module 414 may further reduce each billing item's remittable amount by accessing each billing item's corresponding payment terms item from payment items module 410, and aggregating the net amount for each billing item. In one embodiment, the aggregation module 414 removes duplicate billing items. For example, if a learning user accessed the same tools for two learning applications, the aggregation module 414 determines that the cost of the learning tools should only be remitted once to the learning tool supplier rather than twice. The aggregation module 414 is accessed by remittance items database 412 to update the amount remittable to a given remitted user during a given remittance cycle, and by the payment processing module 402 to determine the net amount to be remitted to the remitted user in a given remitted cycle. If one or a plurality of local taxation items are applicable to the remittance item and corresponding net aggregate amount, the aggregation module 414 may further access applicable local taxation items from local taxation module 416 and adjust the net amount to be processed by module 402 before granting access to the adjusted net amount to modules 412 and 402 in module 242.

The local taxation module 416, in some embodiments, is configured for receiving, storing, retrieving and updating a plurality of local taxation items to compute taxes and levies imposed on the net aggregate amount to be remitted to each remitted user in each remittance cycle. The subset of local taxation items applicable to each remitted user may be stored against each remitted user's corresponding identity items in the user database 202, by accessing the same from the larger plurality of local taxation items for each tax region of the world present in the database of local taxation module 416. In some embodiments, the local taxation items applicable to the remitted users may be determined by accessing the location identity items of each remitted user from the corresponding databases of the modular learning system 144. In some embodiments, the local taxation module 416 computes the applicable local taxation items and stores the applicable local taxation items with the corresponding amounts to be displayed to the remitted users on the users' user devices 140 by interface generator 420. In some embodiments, the local taxation module 416 may further determine the local taxation items applicable to each remitted user by accessing the location identity items of the plurality of learning users and other kinds of users for whom the corresponding billing items were generated in billing items database 404 by accessing the same from user database 202 or other databases of the modular learning system 144. In some embodiments, the local taxation module 416 may further determine the local taxation items relevant to the remitted users by accessing the location identity items of the transaction processor of the modular learning system 144 by accessing the same from payment processing module 402.

The role validation module 418 is configured for validating the remitted user's user role to determine the payment terms items, remittance cycle and local taxation items relevant to the remitted user's user role and present in corresponding modules 408, 410, and 416. The role validation module 418 also determines the applicable remittance interface and corresponding remittance interface items to be generated by interface generator 420 and displayed to the remitted user through the remittance summary interface on any of the remitted users' user devices 140. For example, in case of a remitted user whose role is validated by role validation module 418 as that of a tutoring user by accessing the user database 202, the payment terms item may indicate a service charge of 10% of each billing item for a tutoring user, the remittance cycle module 408 may indicate a remittance cycle of 45 days from the first of every month for a tutoring user, and the local taxation module 416 may indicate no service tax applicable for a billing item under a certain amount generated for a tutoring user. Further, in the example, the remitted user may have access to the tutoring user remittance interface with corresponding remittance items distinct from those of, say, a learning application authoring user, with the interface items generated by interface generator 420 and displayed to the remitted user 112 through the remittance cycle interface on the remitted user 112's user device 140.

The remittance summary interface generator 420 is configured for generating a plurality of remittance interface items as applicable for the validated user role of each remitted user by accessing the same from role validation module 418, and generates a unique interface item for each remittance item accessed from remittance items database 412 and, optionally, generates a plurality of interface items for corresponding data items by accessing a plurality of other modules in the remittance module 242. The interface generator 420 displays the plurality of interface items through the remittance summary interface based on each remitted user's user role, to the remitted user on the remitted users' user devices 140.

The learner billing module 422 is configured for determining the prepaid account balance of the learning user 102 and is further configured for checking if the prepaid account balance of the learning user 102 is higher than or equal to or less than the billed price of the corresponding purchase item for the remitted user's learning application, application service or microlearning event.

Although the role based remittance module is described as being composed of various modules, fewer or more modules (e.g., Remitted Users Database, Intra-system Purchase Items Module) may comprise the module with the present invention still falling within the scope of various embodiments.

FIG. 5 is an example tutor account summary interface 500 generated by the remittance summary interface generator 420 of the remittance module 242. The account summary cell 502 may be generated for a tutoring user 112 by remittance summary interface generator 420, by accessing the corresponding account summary items from accounting module 406 in the remittance module 242 of the modular learning system 144. In the account summary 502, net tutor access remittance item 504 represents the adjusted net aggregate remittance amount retrieved from the local taxation module 416 or, optionally, the aggregation module 414 for the unique remittance item generated and stored by remittance items database 412 for the remittance cycle of three months as stored for the tutoring user in remittance cycle module 408. Before generating the remittance summary and processing the transaction, the role validation module 418 confirms that the remittance summary is being generated for a tutoring user on the modular learning system 144. Accordingly the remittance module 242 determines that the service charge for tutor access billing items is, for example, 10% while aggregating the remittance item 504 by accessing the corresponding payment terms item from payment items module 410. The tutor registration charges expense item and corresponding interface cell 506 represents an intra-system purchase item for a purchase conducted by the tutoring user 112 with another user or, optionally, as in this case, the modular learning system 144 during the tutoring user's remittance cycle with the expenses being offset against the net remittance interface item 504 and the adjusted net amount due to the tutoring user displayed within the account summary interface item 502. In one embodiment, the remittance summary interface generator 420 accesses the learner billing items and corresponding data fields in the tutor access billing interface cell 508 from the billing items database 404, the optional intra-system purchase items and corresponding data fields in the corresponding interface cell 506 from an intra-system purchase management module of the modular learning system 144, the net remittance item 504 from the aggregation module 414 and, in this case optionally, from the local taxation module 416, in addition to the account summary items in interface cell 502 from accounting module 406 and a plurality of other items like the remittance cycle item from the remittance cycle module 408, the service charges payment terms item from payment items module 410, and the remitted tutoring user 112's identity items like the name, tutoring user registration number from user database 202 of the modular learning system 144, generates the corresponding interface items for the data items, and displays the same to the remitted user, in this case tutoring user 112, on user 112's user device 140.

Figure 6A:
FIG. 6 illustrates a learning application author remittance summary interface generated by the role based remittance module according to one embodiment.

Similarly, FIGS. 6A and 6B is the learning application author account summary interface 600 generated by the remittance summary interface generator 420 of the remittance module 242. The account summary cell 602 may be generated for a learning application authoring user, say user 104, by remittance summary interface generator 420 by accessing the corresponding account summary items from accounting module 406 in the remittance module 242 of the modular learning system 144. In the account summary 602, net learning application sales remittance item 604 represents the adjusted net aggregate remittance amount retrieved from the local taxation module 416 or, optionally, the aggregation module 414 for the unique remittance item generated and stored by remittance items database 412 for the remittance cycle of 3 months as stored for the learning application authoring user in remittance cycle module 408. Before generating the remittance summary and processing the transaction, the role validation module 418 confirms that the remittance summary is being generated for a learning application authoring user on the modular learning system 144 and accordingly the remittance module 242 determines that the service charge for learning application sales billing items is, for example, 10% while aggregating the remittance item 604 by accessing the corresponding payment terms items from module 410.

The learning application author registration charges expense item and corresponding interface cell 606 represents an intra-system purchase item for a purchase conducted by the learning application authoring user 104 with another user like a learning application translating user 106, a learning application template developing user 110 or, optionally, as in this case, the modular learning system 144, during the learning application authoring user's remittance cycle with the expenses being offset against the net remittance interface item 604 and the adjusted net amount due to the learning application authoring user displayed in the account summary interface item 602. In various embodiments, the remittance summary interface generator 420 accesses the learner billing items and corresponding data fields in the learning application sales billing interface cell 608 from the billing items database 404, the optional intra-system purchase items and corresponding data fields in the corresponding interface cell 606 from the intra-system purchase management module on the modular learning system 144, the net remittance item 604 from the aggregation module 414 and, in this case optionally, from the local taxation module 416, or the account summary items in interface cell 602 from accounting module 406 or a plurality of other items like the remittance cycle item from module 408, the service charges payment terms item from the payment items module 410, and the remitted learning application authoring user 104's identity items like the name, learning application authoring user registration number from database 206 of the modular learning system 144, generates the corresponding interface items for the entire plurality of the data items, and displays the same to the remitted user, in this case learning application authoring user 104, on user 104's user device 140.

Similarly, FIGS. 7A and 7B is a template developer account summary interface 700 generated by the remittance summary interface generator 420 of the remittance module 242. The account summary cell 702 may be generated for a learning application template developing user 110 by remittance summary interface generator 420, by accessing the corresponding account summary items from accounting module 406. In the account summary 702, net learning application template sales remittance item 704 represents the adjusted net aggregate remittance amount retrieved from the local taxation module 416 or, optionally, the aggregation module 414 for the unique remittance item generated and stored by remittance items database 412 for the remittance cycle of 3 months as stored for the learning application template developing user in remittance cycle module 408. Before generating the remittance summary and processing the transaction, the role validation module 418 confirms that the remittance summary is being generated for a learning application template developing user on the modular learning system 144 and accordingly the remittance module 242 determines that the service charge for learning application template sales billing items is, for example, 10% while aggregating the remittance item 704 by accessing the corresponding payment terms items from module 410.

The learning application template developer registration charges expense item and corresponding interface cell 706 represents an intra-system purchase item for a purchase conducted by the learning application template developing user 110 with another user or, optionally, as in this case the modular learning system 144 during the learning application template developing user's remittance cycle with the expenses being offset against the net remittance interface item 704 and the adjusted net amount due to the learning application template developing user displayed within the account summary interface item 702. In various embodiments, the remittance summary interface generator 420 accesses the learning application author billing items and corresponding data fields in the learning application template sales billing interface cell 708 from an intra-system purchase management module in system 144, other optional intra-system purchase items, and corresponding data fields in the corresponding interface cell 706, the net remittance item 704 from the aggregation module 414 and, in this case optionally, from the local taxation module 416, in addition to the account summary items in interface cell 702 from accounting module 406 and a plurality of other items like the remittance cycle item from remittance cycle module 408, the service charges payment terms items from payment items module 410, and the remitted learning application template developing user 110's identity items like name and learning application template developing user registration number, generates the corresponding interface items for the entire plurality of the data items and displays the same to the remitted user, in this case learning application template developing user 110, on user 110's user device 140.

Figure 8A:
FIG. 8 illustrates a translator remittance summary interface generated by the role based remittance module according to one embodiment.

Similarly, FIGS. 8A and 8B is the translator account summary interface 800 generated by the remittance summary interface generator 420 of the remittance module 242. The account summary cell 802 may be generated for a learning application translating user 106 by remittance summary interface generator 420, by accessing the corresponding account summary items from accounting module 406. In the account summary 802, net learning application translation service sales remittance item 804 represents the adjusted net aggregate remittance amount retrieved from the local taxation module 416 or, optionally, the aggregation module 414 for the unique remittance item generated and stored by module 412 for the remittance cycle of 3 months as stored for the learning application translating user in remittance cycle module 408. Before generating the remittance summary and processing the transaction, the role validation module 418 confirms that the remittance summary is being generated for a learning application translating user on the modular learning system 144 and accordingly the remittance module 242 determines that the service charge for learning application translation service sales billing items is, for example, 10% while aggregating the remittance item 804 by accessing the corresponding payment terms items from module 410.

The learning application translator registration charges expense item and corresponding interface cell 806 represents an intra-system purchase item for a purchase conducted by the learning application translating user 106 with another user or, optionally, as in this case the modular learning system 144 during the learning application translating user's remittance cycle with the expenses being offset against the net remittance interface item 804 and the adjusted net amount due to the learning application translating user displayed within the account summary interface item 802. In various embodiments, the remittance summary interface generator 420 accesses the learning application author billing items and corresponding data fields in the learning application translation service sales billing interface cell 808 from the intra-system purchase management module of system 144, the other optional intra-system purchase items and corresponding data fields in the corresponding interface cell 806 from the intra-system purchase management module on the system 144, the net remittance item 804 from the aggregation module 414 and, in this case optionally, from the local taxation module 416, in addition to the account summary items in interface cell 802 from accounting module 406 and a plurality of other items like the remittance cycle item from remittance cycle module 408, the service charges payment terms items from payment items module 410, and the remitted learning application translating user 106's identity items like name and learning application translating user registration number, generates the corresponding interface items for the data items, and displays the same to the remitted user, in this case learning application translating user 106, on user 106's user device 140.

Similarly, FIGS. 9A and 9B is a learning facility account summary interface 900 generated by the remittance summary interface generator 420 of the remittance module 242. The account summary cell 902 may be generated for a learning facility administering user 124 by remittance summary interface generator 420 by accessing the corresponding account summary items from accounting module 406. In the account summary 902, net learning facility access remittance item 904, net learning tool sales remittance item 906, and net learning tools rental remittance item 908 represent the adjusted net aggregate remittance amount retrieved from the local taxation module 416 or, optionally, the aggregation module 414 for the unique remittance items generated and stored by remittance items database 412 for the remittance cycle of, for example, 3 months as stored for the learning facility administering user in remittance cycle module 408. Before generating the remittance summary and processing the transaction, the role validation module 418 confirms that the remittance summary is being generated for a kind of learning facility administering user, in this case an independent learning facility administering user on the modular learning system 144 and accordingly the remittance module 242 determines that the service charge for learning facility access billing items is, for example, 10%, learning tool sales billing items is, for example, 10%, and learning tool rental billing items is, for example, 10% while aggregating the remittance items 904, 906 and 908 by accessing the corresponding payment terms items from module 410.

The learning facility registration charges expense item, franchise royalty expense item, learning infrastructure rental expense items, learning infrastructure purchased expense items, learning infrastructure maintenance expense items, learning tools rental expense items, learning tool purchased expense items, learning infrastructure installation charges expense items and the plurality of local taxation items and corresponding interface cells 910, 912, 914, 916, 918, 920, 922, 924 and 926 represent intra-system purchase items for a purchase conducted by the learning facility administering user 124 with another user like a learning tool supplying user 118, the learning infrastructure provider and, optionally, the modular learning system 144, during the learning facility administering user's remittance cycle with the expenses being offset against the net remittance interface items 904, 906 and 908 and the adjusted net amount due to or by the learning facility administering user displayed within the account summary interface item 902. In various embodiments, the remittance summary interface generator 420 accesses the learner billing items and corresponding data fields in the learning facility access, learning tool sales and learning tool rental billing items billing interface cells 928, 930 and 932 from the billing items database 404, the optional intra-system purchase items and corresponding data fields in the corresponding interface cells 910, 912, 914, 916, 918, 920, 922 and 924 from the intra-system purchase management module on the modular learning system 144, the net remittance items cells 904, 906 and 908 from the aggregation module 414, and, optionally, from the local taxation module 416, the expense related taxation items, and corresponding data fields in the corresponding interface cell 926 for the optional plurality of corresponding intra-system expense items from local taxation module 416 or, optionally, the corresponding taxation module in the intra-system purchase management module of system 144, in addition to the account summary items in interface cell 902 from accounting module 406 and a plurality of other items like the remittance cycle item from remittance cycle module 408, the service charges payment terms items from payment items module 410, and the remitted learning facility administering user 124's identity items like name and learning facility registration number, generates the corresponding interface items for the entire plurality of the data items, and displays the same to the remitted user, in this case learning facility administering user 124, on user 124's user device 140.

Similarly, FIGS. 10A and 10B is the learning event organizer account summary interface 1000 generated by the remittance summary interface generator 420 of the remittance module 242. The account summary cell 1002 may be generated for a learning event organizing user 116 by remittance summary interface generator 420, by accessing the corresponding account summary items from accounting module 406 in the remittance module 242 of the modular learning system 144. In the account summary 1002, net learning event sales remittance item 1004 represents the adjusted net aggregate remittance amount retrieved from the local taxation module 416 or, optionally, the aggregation module 414 for the unique remittance items generated and stored by remittance items database 412 for the remittance cycle of, for example, three months, as stored for the learning event organizing user in remittance cycle module 408. Before generating the remittance summary and processing the transaction, the role validation module 418 confirms that the remittance summary is being generated for a kind of learning event organizing user, in this case a learning workshops organizing user on the modular learning system 144 and accordingly the remittance module 242 determines that the service charge for learning event sales billing items is, for example, 10%, while aggregating the remittance item 1004 by accessing the corresponding payment terms item from module 410.

The learning event organizer registration charges expense item, inspection charges expense items, learning application services expense items and the plurality of local taxation items and corresponding interface cells 1006, 1008, 1010 and 1012 represent intra-system purchase items for a purchase conducted by the learning event organizing user 116 with another user, say an application service providing user like tutoring user 112, learning facility administering user 124, and learning tools supplying user 118 and, optionally, the modular learning system 144, during the learning event organizing user's remittance cycle with the expenses being offset against the net remittance interface item 1004 and the adjusted net amount due to the learning event organizing user displayed within the account summary interface item 1002. In various embodiments, the remittance summary interface generator 420 accesses the learner billing items and corresponding data fields in the learning event sales billing items in billing interface cell 1014 from the billing items database 404, the optional intra-system purchase items, and corresponding data fields in the corresponding interface cells 1006, 1008 and 1010 from the intra-system purchase management module on the modular learning system 144, the net remittance items cell 1004 from the aggregation module 414 and, in this case optionally, from the local taxation module 416, the expense related taxation items and corresponding data fields in the corresponding interface cell 1012 for the optional plurality of corresponding intra-system expense items from local taxation module 416 or, optionally, the corresponding taxation module in the intra-system purchase management module of the modular learning system 144, in addition to the account summary items in interface cell 1002 from accounting module 406 and a plurality of other items like the remittance cycle item from remittance cycle module 408, the service charges payment terms items from the payment items module 410, and the remitted learning event organizing user 116's identity items like name and learning event organizer registration number, generates the corresponding interface items for the data items, and displays the same to the remitted user, in this case learning event organizing user 116, on user 116's user device 140.

Similarly, FIGS. 11A and 11B is a tool supplier account summary 1100 generated by the remittance summary interface generator 420 of the remittance module 242. The account summary cell 1102 may be generated for a learning tool supplying user 118 by remittance summary interface generator 420, by accessing the corresponding account summary items from accounting module 406 in the remittance module 242 of the modular learning system 144. In the account summary 1102, net learning tool sales remittance item 1104 and net learning tool rental remittance item 1106 represent the adjusted net aggregate remittance amount retrieved from the local taxation module 416 or, optionally, the aggregation module 414 for the unique remittance items generated and stored by remittance items database 412 for the remittance cycle of, for example, 3 months as stored for the learning tool supplying user in remittance cycle module 408. Before generating the remittance summary and processing the transaction, the role validation module 418 confirms that the remittance summary is being generated for a learning tool supplying user on the modular learning system 144 and accordingly the remittance module 242 determines that the service charge for learning tools sales billing item and learning tool rental billing item is 10% while aggregating the remittance items 1104 and 1106 by accessing the corresponding payment terms item from module 410.

The tool supplier registration charges expense item and corresponding interface cell 1108 represents intra-system purchase items for a purchase conducted by the learning tool supplying user 118 with another user and, optionally, as in this case, the modular learning system 144, during the learning tool supplying user's remittance cycle with the expenses being offset against the net remittance interface items 1104 and 1106 and the adjusted net amount due to the learning tool supplying user displayed within the account summary interface item 1102. In various embodiments, the remittance summary interface generator 420 accesses the learner billing items and corresponding data fields in the learning tool sales billing items and learning tools rental billing items in billing interface cells 1110 and 1112 from the billing items database 404, the optional intra-system purchase items and corresponding data fields in the corresponding interface cell 1108 from the intra-system purchase management module on the modular learning system 144, the net remittance items cells 1104 and 1106 from the aggregation module 414 and, in this case optionally, from the local taxation module 416, in addition to the account summary items in interface cell 1102 from accounting module 406 and a plurality of other items like the remittance cycle item from remittance cycle module 408, the service charges payment terms items from the payment terms module 410, and the remitted learning tool supplying user 118's identity items like name and tool supplier registration number, generates the corresponding interface items for the data items, and displays the same to the remitted user, in this case learning tool supplying user 118, on user 118's user device 140.

Although the remitted users for the remittance items for purchases billed to learning users or other intra-system users in modular learning system 144 are one, some, or all of a plurality of tutoring users, learning application authoring users, learning application template developing users, learning application translating users, learning tools supplying users, a plurality of kinds of learning facility administering users and a plurality of kinds of learning event organizing users, other kinds of users (e.g., Learning Application Certifying Users, Learning Infrastructure Supplying Users) may be remitted users, with the present invention still falling within the scope of various embodiments.

Figure 12:
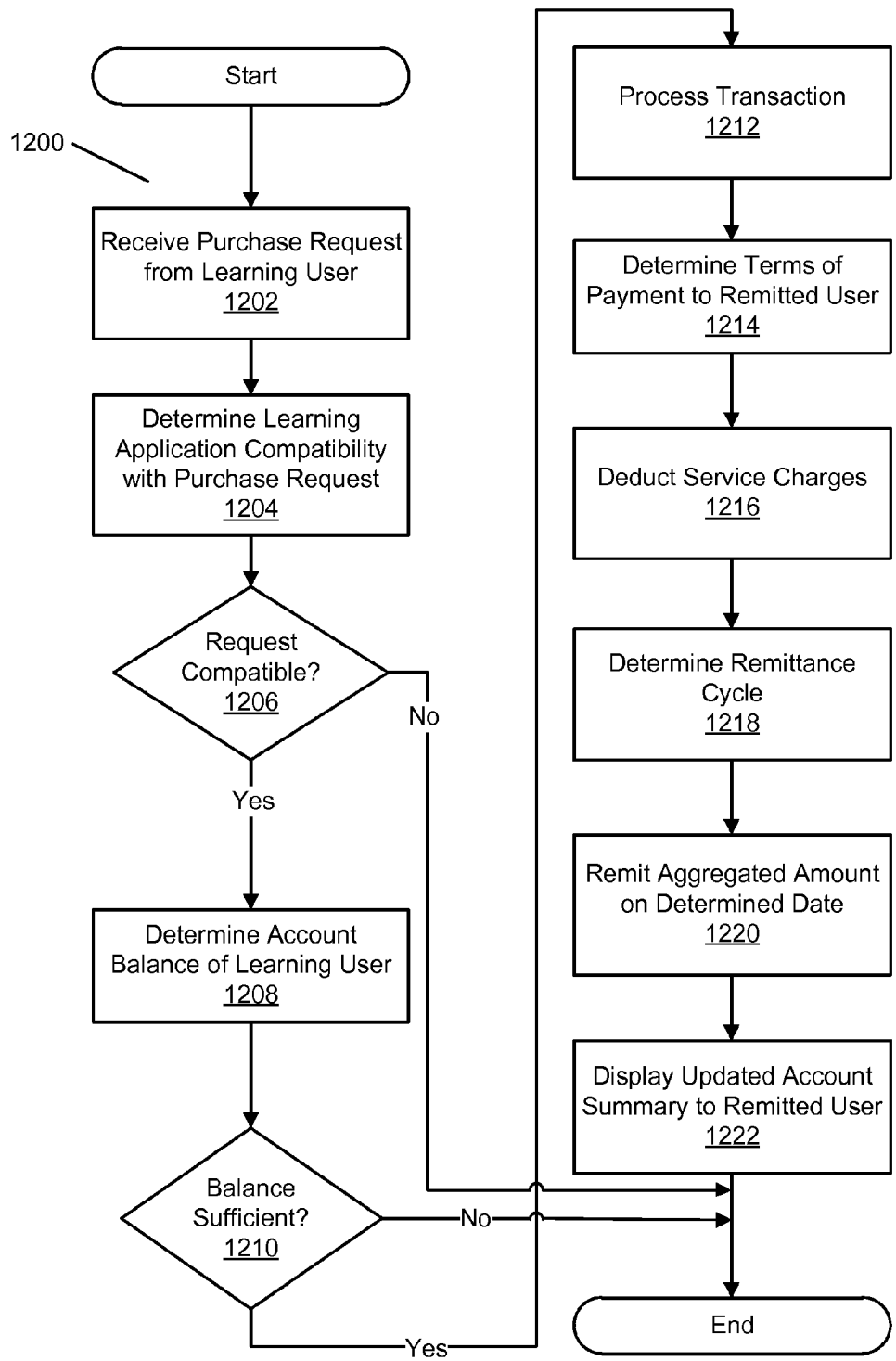
FIG. 12 is a flow diagram of the method for managing role based modular remittances in a modular learning system according to one embodiment.

FIG. 12 is a flow diagram 1200 of a method for managing role based modular remittances in a modular learning system environment. At step 1202, the microlearning purchase management module 238 receives a microlearning purchase request from a learning user 102, from among the plurality of learning users in user database 202 of the modular learning system 144 for a specified learning application. At step 1204, the purchase management module 238 determines the learning user 102's compatibility to the learning application, application service or learning event purchase request. At step 1206, the purchase management module 238 determines the compatibility of the microlearning purchase request and the corresponding learning application or a plurality of learning applications with the requesting learning user 102 by accessing the learning user 102's identity items and preference items from user database 202 and, optionally, a plurality of identity items and preference items in databases of application service providers, as well as a plurality of metadata of the corresponding requested learning application or plurality of applications from the learning application metadata module in the modular learning system 144. If purchase management module 238 determines that the request is not compatible with the identity items or, optionally, preference items of the learning user 102, the purchase request is denied by purchase management module 238 and no corresponding purchase item or billing item is generated by purchase management module 238. In such cases, the billing items database 404 does not access any billing item for the purchase request, and the purchase request amount is not aggregated by aggregation module 414 or included in the corresponding remitted user's remittance item in the ongoing remittance cycle.

At step 1208, if a purchase request for any remitted user's learning application, application service or microlearning event is compatible with the requesting learning user 102, the microlearning purchase management module 238 requests the learner billing module 422 to determine the prepaid account balance of the learning user. At step 1210, the learner billing module 422 determines if the prepaid account balance of the learning user 102 is higher than or equal to the billed price of the corresponding purchase item for the remitted user's learning application, application service or microlearning event. If the learner billing module 422 determines that the prepaid account balance of learning user 102 is less than the billed price of the purchase item for the remitted user's learning application, application service or microlearning event, the microlearning purchase management module 238 does not proceed to process the transaction and no corresponding billing item is stored in the billing items database 404 by purchase management module 238 or the learner billing module. If the remitted user changes the post-paid billing terms preferences for a purchase item or a plurality of purchase items offered by the remitted user and agrees to bear the risk of non-payment at a later stage by the learning user 102 for the purchase request in the next billing cycle, the learner billing module 422 may generate a post-paid billing item for the microlearning purchase with the item accessed by the billing items database 404 and included in a remittance cycle and corresponding remittance item of the remitted user only after the billing transaction of the learning user is processed by the billing module and a corresponding purchase item is generated for the microlearning purchase by the microlearning purchase management module 238.

At step 1212, if the prepaid account balance of the learning user 102 is sufficient for the microlearning purchase, the microlearning purchase management module 238 processes the microlearning purchase transaction and the purchase management module 238 generates a corresponding billing item which is accessed by the billing items database 404 and included for aggregation by module 414 in the next remittance cycle of the remitted user in the modular learning system 144. At step 1214, in embodiments wherein a plurality of such transactions have occurred for learning applications, application services or microlearning events offered by the remitted user, the remittance module 242 generates remittance items for the most recent unremitted remittance cycle of the remitted user and the billing items database 404 receives and stores a plurality of corresponding billing items for access by aggregation module 414. Further, the aggregation module 414 determines the terms of payment for each billing item for the remitted user or user role by accessing the payment items module 410.

At step 1216, the aggregation module 414 determines the net remittance amount after deducting the corresponding payment terms item amount such as a service charge, retail margin or other amount from each billing item and aggregating the net billing item amounts for the remittance item. In some embodiments, if the aggregated net remittance amount is to be adjusted for local taxations and levies applicable in module 416, the aggregation module 414 adjusts the remittance amount accordingly and determines the aggregated, arrived after aggregating plurality of service charges, and adjusted net remittance amount for the remittance amount and remittance cycle of the remitted user. At step 1218, the payment processing module 402 accesses the remittance cycle item of the remitted user from remittance cycle module 408 and determines the date or time of remittance for the remittance cycle and corresponding net remittance amount to the corresponding remitted user. At step 1220, on the determined date, and, optionally, determined time accessed from remittance cycle module 408, the payment processing module 402 processes the remittance transaction for the aggregated and adjusted net remittance amount of the corresponding remittance item, to the remitted user and calculates the updated account balance of learning user.

At step 1222, upon a request by the remitted user after the remittance transaction is processed, the accounting module 406 generates the remitted user's remittance account summary and corresponding account summary interface items by accessing the corresponding items from a plurality of modules in the role based remittance module 242. The remittance summary interface generator 420 accesses the interface items from the accounting module 406 and displays the same to the requesting remitted user through the remittance summary interface generated by the generator 420 and displayed to the remitted user on the user's user device 140.

In an embodiment, the currency of remitted service charge may be different from currency of the account balance associated with the learning user 102.

Although the method for managing role based modular remittances in a modular learning system environment is described as being composed of various steps, fewer or more steps (e.g., Aggregate Billing Items For Most Recent Unremitted Remittance Cycle, Determine Net Adjusted Remittance Amount Based On Local Taxation and Levies, Validate User Role of Remitted User) may comprise the method with the present invention still falling within the scope of various embodiments.

In additional embodiment, the invention describes an apparatus for managing modular remittances in a modular learning system comprising a processor configured to execute instructions stored on a non-transitory medium and a non-volatile memory including instructions executable to perform steps of the method of invention.

Computing Machine Architecture

Figure 13:
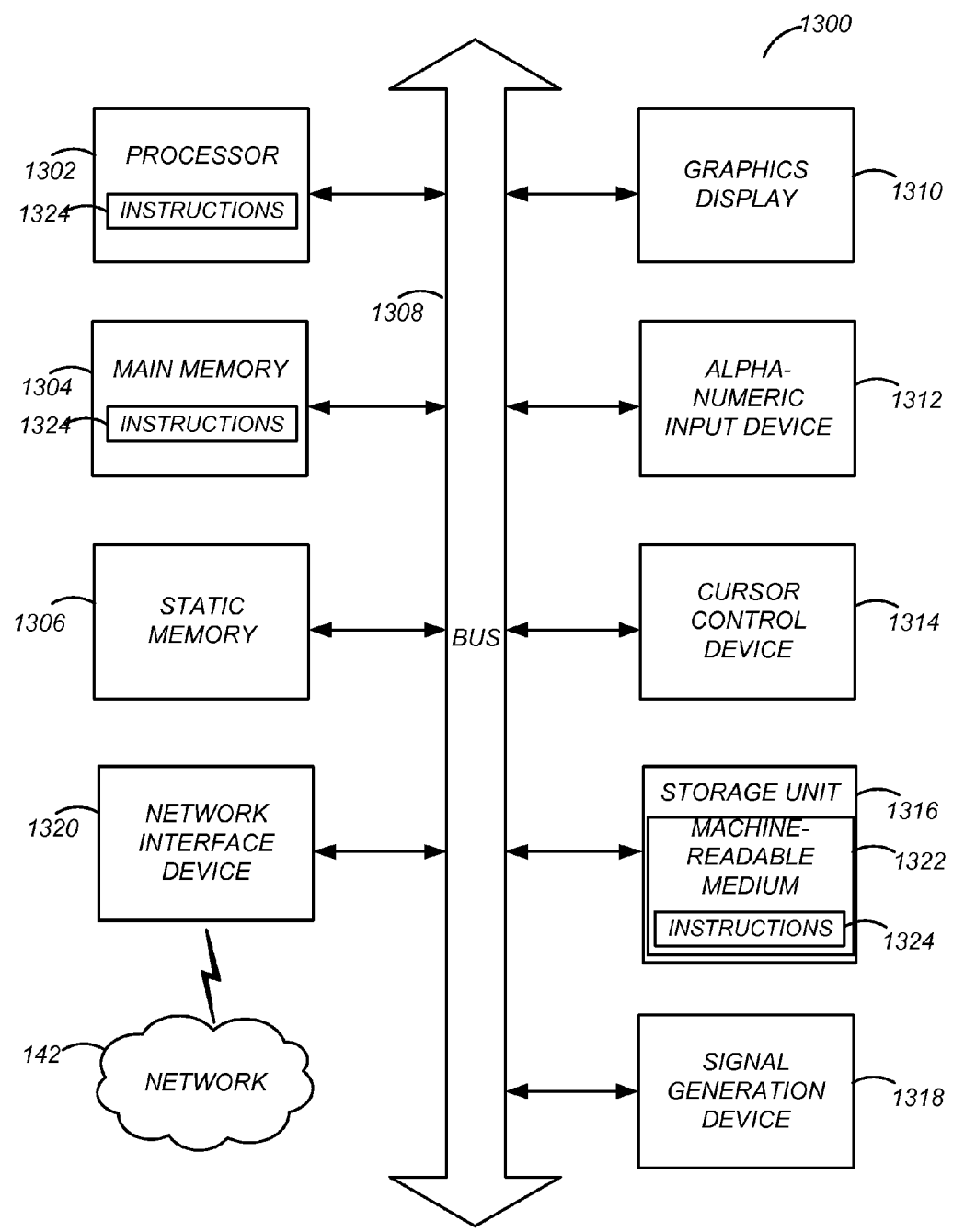
FIG. 13 illustrates components of an example machine able to read instructions from a machine-readable medium and execute them in a processor (or controller) according to one embodiment.

FIG. 13 is a block diagram illustrating components of an example machine suitable for use as a modular learning system 144 (e.g., as illustrated in FIGS. 1-4), in which any of the embodiments disclosed herein may be performed, according to one embodiment. This example machine is able to read instructions from a machine-readable medium and execute them in a processor (or controller).

Specifically, FIG. 13 shows a diagrammatic representation of a machine in the example form of a computer system 1300 within which instructions 1324 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1324 (sequential or otherwise) that specify actions to be taken by that machine. Further, while only a single machine is illustrated, the term "machine" shall also be taken to include any collection of machines that individually or jointly execute instructions 1324 to perform any one or more of the methodologies discussed herein.

The example computer system 1300 includes a processor 1302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1304, and a static memory 1306, which are configured to communicate with each other via a bus 1308. The computer system 1300 may further include a graphics display unit 1310 (e.g., a plasma display panel (PDP), a liquid crystal display (LCD), a projector, or a cathode ray tube (CRT)). The computer system 1300 may also include alphanumeric input device 1312 (e.g., a keyboard), a cursor control device 1314 (e.g., a mouse, a trackball, a joystick, a motion sensor, or other pointing instrument), a storage unit 1316, a signal generation device 1318 (e.g., a speaker), and a network interface device 1320, which also are configured to communicate via the bus 1308.

The storage unit 1316 includes a machine readable medium 1322 on which is stored instructions 1324 (e.g., software) embodying any one or more of the methodologies or functions described herein. The instructions 1324 (e.g., software) may also reside, completely or at least partially, within the main memory 1304 or within the processor 1302 (e.g., within a processor's cache memory) during execution thereof by the computer system 1300, the main memory 1304 and the processor 1302 also constituting machine-readable media. The instructions 1324 (e.g., software) may be transmitted or received over a network 142 via the network interface device 1320.

While machine readable medium 1322 is shown in an example embodiment to be a single medium, the term "machine-readable medium" should be taken to include a single medium or multiple media (e.g., a centralized or distributed database, or associated caches and servers) able to store instructions (e.g., instructions 1324). The term "machine-readable medium" shall also be taken to include any medium that is capable of storing instructions (e.g., instructions 1324) for execution by the machine and that cause the machine to perform any one or more of the methodologies disclosed herein. The term "machine-readable medium" includes, but not be limited to, data repositories in the form of solid-state memories, optical media, and magnetic media.

The modular learning system 144 may be one or more servers in which one or more methods disclosed herein are performed. The processor 1302 may be a microprocessor, a state machine, an application specific integrated circuit, a field programmable gate array, etc. (e.g., Intel® Pentium® processor). The main memory 804 may be a dynamic random access memory and/or a primary memory of the modular learning system 144. The static memory 1306 may be a hard drive, a flash drive, and/or other memory information associated with the modular learning system 144.

The bus 1308 may be an interconnection between various circuits and/or structures of the modular learning system 144. The video display 1310 may provide graphical representation of information on the modular learning system 144. The alphanumeric input device 1312 may be a keypad, keyboard and/or any other input device. The cursor control device 1314 may be a pointing device such as a mouse.

The storage unit 1316 may be a hard drive, a storage system, and/or other longer term storage subsystem. The signal generation device 1318 may be a bios and/or a functional operating system of the modular learning system 144. The network interface device 1320 may be a device that may perform interface functions such as code conversion, protocol conversion and/or buffering required for communication to and from a network (e.g., the network 142 of FIG. 1). The machine readable medium 1322 may provide instructions 1324 on which any of the methods disclosed herein may be performed. The instructions 1324 may provide source code and/or data code to the processor 1302 to enable any one/or more operations disclosed herein. For example, the modular learning system 144 may be stored in the form of instructions 1324 on a storage medium such as the main memory 1304 and/or the machine readable medium 1322 such as compact disk.

In one embodiment, a computer-readable storage medium having a program executable by a computing device (e.g., the modular learning system 144) causes the computing device to perform method steps illustrated in FIG. 12.

Additional Configuration Considerations

In order to achieve one or more educational objectives, learning users may select a set of learning applications to perform. The role based remittance module 242 manages remittances for each type of remitted user associated with the set of applications completed by the learning user, remitting a correct amount to each remitted user while taking into consideration components of the applications that may be shared. For example, a learning user may purchase access to both a tennis application and a swimming application, each requiring a separate tutor and unique learning tools. The role based remittance module 242 determines a remittance due to each of the tutoring users and tools supplying users according to the methods described above. However, the learning user may purchase access to a swim and racket club as a facility to host both learning applications. Because the facility is shared between two distinct learning applications, the aggregation module 414 may determine that the facility access is duplicated between two applications and remove the duplicative charge before the remittance module 242 remits the cost of facility access to the facility administering user.

In one embodiment, when a learning user purchases access to a plurality of learning applications, the purchase management module 238 may retrieve information about infrastructures and amenities available at a learning facility from the facilities database 230 and determine a facility most efficient for hosting the learning applications. For example, the purchase management module 238 may recommend a single swim and racket club, rather than an individual pool and tennis court, to a user who has purchased access to a swimming application and a tennis application. The role based remittance module 242 then manages appropriate remittances, taking into account the shared facility.

Throughout this specification, plural instances may implement modules, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate modules in example configurations may be implemented as a combined structure or module. Similarly, structures and functionality presented as a single module may be implemented as separate modules. These and other variations, modifications, additions, and improvements fall within the scope of the subject matter herein.

Certain embodiments are described herein as including functionality implemented in computing logic or a number of components, modules, or mechanisms, for example, as illustrated in FIGS. 2, 4, and 5. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

In another embodiment, the microlearning purchase and performance interface provided by the modular learning system 144 can be accessed over a local area network, intranet or virtual private network accessible to a limited plurality of user devices at a preschool, school, college, university, educational board, professional standards authority, coaching class, a company, HR department, training department or at a training organization through a user device.

In another embodiment, the microlearning purchase and performance interface provided by the modular learning system 144 can be accessed over a wide area network, General Packet Radio Service network, an Enhanced Data for Global Evolution network, a 3G telecommunications network, a 4G LTE telecommunications network or other telecommunications network through a user device.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Although the present embodiments have been described with reference to specific example embodiments, it will be evident that various modifications and changes may be made to these embodiments without departing from the broader spirit and scope of the various embodiments. For example, the various devices, modules, databases, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine modules that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and modules of the embodiments herein. This is done merely for convenience and to give a general sense of the invention. This description should be read to include one or at least one and the singular also includes the plural unless it is obvious that it is meant otherwise.

According to the embodiments described in FIG. 1 through 12, various methods and electric structures may be embodied using transistors, logic gates, and electrical circuits (e.g., Application Specific Integrated Circuitry and/or in Digital Signal Processor circuitry). For example, the purchase management module 238, performance management module 240 and other modules of FIGS. 1 to 12 may be enabled using a purchase management circuit, a performance management circuit, and other circuits using one or more of the technologies described herein. In addition, it will be appreciated that the various operations, processes, and methods disclosed herein may be embodied in a machine-readable medium and/or a machine accessible medium compatible with a data processing system (e.g., a server) and may be performed in any order. Accordingly, the specification and drawings are to be regarded in an illustrative rather than a restrictive sense.

Upon reading this disclosure, those of skill in the art will appreciate still additional alternative structural and functional designs for a system and a process for managing the purchase and performance of learning applications and associated application services in a microlearning stack through the disclosed principles herein. Thus, while particular embodiments and applications have been illustrated and described, it is to be understood that the disclosed embodiments are not limited to the precise construction and modules disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for managing modular remittances through an electronic remittance module provided in a learning system comprising:

maintaining an electronic learning user database including a plurality of learning users, the electronic learning user database being accessible over an Internet-based computer network, each learning user associated with an account balance;

maintaining an electronic remitted user database including a plurality of remitted users, each remitted user associated with a remittance cycle, wherein the remitted users include any three or more of a tutoring user, a learning application authoring user, a learning facility administrating user, a microlearning event organizing user, a learning application translating user, a learning application template developing user, a learning tool supplying user, and a learning user of the plurality of learning users;

maintaining an electronic modular learning system including a plurality of processor-implemented modules, the processor-implemented modules including an electronic microlearning purchase management module and an electronic role based remittance module, the learning system operating in a learning environment and communicating with the learning users in the learning environment over the Internet-based computer network, the learning system enabling the plurality of learning users to communicate with one another in the learning environment, the learning system including an electronic learning content module database including a plurality of electronic learning learning content modules, each electronic learning content module associated with metadata describing a service charge and the remitted user in the plurality of remitted users; wherein the metadata of the electronic learning content module comprises at least one of an electronics textbook, an electronic journal, an instructional video, an instructional animation, a distinct mobile application, a browser based web application, a desktop application, an executable file, a program, add in, macro, plugin or instructions associated with a plurality of application programming interfaces of the modular learning system;

receiving, from each of a plurality of user computing devices operated by respective ones of the learning users in the plurality of learning users over the Internet-based computer network, by the role based remittance module a respective purchase request specifying the corresponding electronic learning content module in the plurality of electronic learning content modules;

calculating, by an electronic payment remittance module for each of the respective ones of the learning users, an updated account balance by subtracting the service charge described by the metadata associated with the corresponding electronic learning content module from the corresponding account balance associated with the respective ones of the learning users;

granting access to the corresponding electronic learning content module on the learning user computing device operated by the respective one of the learning user based on the metadata of the electronic learning content module;

determining, by the role based remittance module, a time to remit each of the service charges associated with the respective ones of the electronic learning content modules based on the remittance cycle associated with the remitted user associated with the specified electronic learning application of the plurality of electronic learning applications;

generating, by an electronic remittance summary interface generator of the role based remittance module, a first summary cell electronic interface for a tutoring user of the remitted users, the first summary cell electronic interface including a tutor access remittance item representing an aggregate remittance amount for the remittance cycle associated with the tutoring user, corresponding units of time of tutoring services provided by the tutoring user to one or more of the learning users, and an amount calculated based on the aggregate remittance amount and the units of time;

the remittance summary interface generator displaying the first summary cell interface on an electronic computing device of the tutoring user;

wherein receiving the purchase request includes receiving a purchase request over the Internet-based computer network from a first of the learning users to purchase at least one of the tutoring services from the tutoring user, and deducting at least an amount of the service charge associated with the purchased tutoring service from an account balance of the first of the learning users, to produce an updated account balance for the first learning user;

generating, by the remittance summary interface generator, an account summary interface for the first learning user to cause the updated account balance of the first learning user to be displayed to the first learning user through an electronic interface displayed on the corresponding user computing device of the learning user;

generating, by the remittance summary interface generator, a second summary cell electronic interface for a learning content module authoring user, the second summary cell electronic interface including a learning content module remittance item representing an aggregate remittance amount for the remittance cycle associated with the learning content module authoring user, corresponding units of copies of software applications authored by the learning content module authoring user, and an amount calculated based on the aggregate remittance amount and the units of copies;

the remittance summary interface generator displaying the second summary cell electronic interface on an electronic computing device of the learning content module authoring user;

wherein receiving the purchase request includes receiving a purchase request from a second of the learning users to purchase one of the electronic learning content modules authored by the learning content module authoring user, and deducting at least an amount of the service charge associated with the purchased learning content module from an account balance of the second of the learning users, to produce an updated account balance for the second learning user;

generating, by the remittance summary interface generator, an account summary electronic interface for the second learning user to cause the updated account balance of the second learning user to be displayed to the second learning user through an electronic interface displayed on the corresponding user computing device of the second learning user;

generating, by the remittance summary interface generator, a third summary cell electronic interface for a learning facility administrator user, the third summary cell electronic interface including a learning facility administrator remittance item representing an aggregate remittance amount for the remittance cycle associated with the learning facility administrator user, corresponding units of time of a rental of a tangible item administered by the learning facility administrator user, and an amount calculated based on the aggregate remittance amount and the units of time of the rental;

the remittance summary interface generator displaying the third summary cell electronic interface on an electronic computing device of the learning facility administrator user;

wherein receiving the purchase request includes receiving a purchase request from a third of the learning users to purchase a rental of the tangible item administered by the learning facility administrator user, and deducting at least an amount of the service charge associated with the purchased rental from an account balance of the third of the learning users, to produce an updated account balance for the third learning user; and generating, by the remittance summary interface generator, an account summary electronic interface for the third learning user to cause the updated account balance of the third learning user to be displayed to the third learning user through an electronic interface displayed on the user computing device of the third learning user.

2. The method of claim 1, wherein the service charge associated with the specified learning content module includes a tax associated with a location of the learning user.

3. The method of claim 1, further comprising:
aggregating, by the remittance module, a plurality of service charges associated with the plurality of electronic learning content modules associated with the remitted user; and
remitting the service charge at the determined time comprises remitting aggregated plurality of service charges wherein the remitted user is associated with the plurality of electronic learning content modules.

4. An apparatus for managing modular remittances through an electronic role based modular remittance module in a learning system, the apparatus comprising:
one or more processors configured to execute instructions stored on one or more computer-readable storage medium or media; the one or more processors being at least one of a microprocessor, a state machine, an application specific integrated circuit or a field programmable gate array;
one or more non-volatile memory devices comprising instructions for execution on the one or more processors, to perform the steps comprising:
maintaining an electronic learning user database including a plurality of learning users, the learning user database being accessible over an Internet-based computer network, each learning user associated with an account balance;
maintaining an electronic remitted user database including a plurality of remitted users, each remitted user associated with a remittance cycle, wherein the remitted users include any three or more of a tutoring user, a learning content module authoring user, a learning facility administrating user, a microlearning event organizing user, a learning content module translating user, a learning content module template developing user, a learning tool supplying user, and a learning user of the plurality of learning users;
maintaining an electronic modular learning system including a plurality of processor-implemented modules, the processor-implemented modules including an electronic microlearning purchase management module and an electronic role based remittance module, the modular learning system operating in a modular learning environment and communicating with the learning users in the learning environment over the Internet-based computer network, the modular learning system enabling the plurality of learning users to communicate with one another in the learning environment, the modular learning system including an electronic learning content module database including a plurality of electronic learning content modules, each electronic learning content module associated with metadata describing a service charge and the remitted user in the plurality of remitted users; wherein the metadata of the electronic learning content module comprises at least one of an electronics textbook, an electronic journal, an instructional video, an instructional animation, a distinct mobile application, a browser based web application, a desktop application, an executable file, a program, add in, macro, plugin or instructions associated with a plurality of application programming interfaces of the learning system;
receiving, from each of a plurality of electronic user computing devices operated by respective ones of the learning users in the plurality of learning users over the Internet-based computer network, by the role based remittance module a respective purchase request specifying the corresponding electronic learning content module in the plurality of electronic learning content modules;

calculating, by an electronic payment remittance module for each of the respective ones of the learning users, an updated account balance by subtracting the service charge described by the metadata associated with the corresponding electronic learning content module from the corresponding account balance associated with the respective ones of the learning users;

granting access to the corresponding electronic learning content module on the learning user computing device operated by the respective one of the learning user based on the metadata of the electronic learning content module;

determining, by the role based remittance module, a time to remit each of the service charges associated with the respective ones of the electronic learning content modules based on the remittance cycle associated with the remitted user associated with the specified learning content module of the plurality of electronic learning content modules;

generating, by an electronic remittance summary interface generator of the role based remittance module, a first summary cell electronic interface for a tutoring user of the remitted users, the first summary cell electronic interface including a tutor access remittance item representing an aggregate remittance amount for the remittance cycle associated with the tutoring user, corresponding units of time of tutoring services provided by the tutoring user to one or more of the learning users, and an amount calculated based on the aggregate remittance amount and the units of time;

the remittance summary interface generator displaying the first summary cell interface on an electronic computing device of the tutoring user;

wherein receiving the purchase request includes receiving a purchase request from a first of the learning users to purchase at least one of the tutoring services from the tutoring user, and deducting at least an amount of the service charge associated with the purchased tutoring service from an account balance of the first of the learning users, to produce an updated account balance for the first learning user;

generating, by the remittance summary interface generator, an account summary electronic interface for the first learning user to cause the updated account balance of the first learning user to be displayed to the first learning user through an interface displayed on the corresponding electronic user computing device of the learning user;

generating, by the remittance summary interface generator, a second summary cell electronic interface for a learning content module authoring user, the second summary cell interface including a learning content module remittance item representing an aggregate remittance amount for the remittance cycle associated with the learning content module authoring user, corresponding units of copies of applications authored by the learning content module authoring user, and an amount calculated based on the aggregate remittance amount and the units of copies;

the remittance summary interface generator displaying the second summary cell interface on an electronic computing device of the learning content module authoring user;

wherein receiving the purchase request includes receiving over the Internet-based computer network a purchase request from a second of the learning users to purchase one of the electronic learning content modules authored by the learning content module authoring user, and deducting at least an amount of the service charge associated with the purchased electronic learning content module from an account balance of the second of the learning users, to produce an updated account balance for the second learning user;

generating, by the remittance summary interface generator, an account summary electronic interface for the second learning user to cause the updated account balance of the second learning user to be displayed to the second learning user through an electronic interface displayed on the corresponding electronic user computing device of the second learning user;

generating, by the remittance summary interface generator, a third summary cell electronic interface for a learning facility administrator user, the third summary cell interface including a learning facility administrator remittance item representing an aggregate remittance amount for the remittance cycle associated with the learning facility administrator user, corresponding units of time of a rental of a tangible item administered by the learning facility administrator user, and an amount calculated based on the aggregate remittance amount and the units of time of the rental;

the remittance summary interface generator displaying the third summary cell electronic interface on an electronic computing device of the learning facility administrator user;

wherein receiving the purchase request includes receiving a purchase request from a third of the learning users to purchase a rental of the tangible item administered by the learning facility administrator user, and deducting at least an amount of the service charge associated with the purchased rental from an account balance of the third of the learning users, to produce an updated account balance for the third learning user; and generating, by the remittance summary interface generator, an account summary electronic interface for the third learning user to cause the updated account balance of the third learning user to be displayed to the third learning user through an electronic interface displayed on the electronic user computing device of the third learning user.

5. The apparatus of claim 4, wherein the service charge associated with the specified learning content module includes a tax associated with a location of the learning user.

6. The apparatus of claim 4, further comprising:

aggregating, by the remittance module, a plurality of service charges associated with the plurality of electronic learning content modules associated with the remitted user; and remitting the service charge at the determined time comprises remitting aggregated plurality of service charges wherein the remitted user is associated with the plurality of electronic learning content modules.

7. A non-transitory computer readable storage medium storing computer program instructions executable by one or more processors for performing a method for managing remittances in a learning system, the method comprising the steps of:

maintaining an electronic learning user database including a plurality of learning users, the learning user database being accessible over an Internet-based computer network, each learning user associated with an account balance;

maintaining an electronic remitted user database including a plurality of remitted users, each remitted user associated with a remittance cycle, wherein the remitted users include any three or more of a tutoring user, a learning content module authoring user, a learning facility administrating user, a microlearning event organizing user, a learning content module translating user, a learning content module template developing user, a learning tool supplying user, and a learning user of the plurality of learning users;

maintaining a learning system including a plurality of processor-implemented modules, the processor-implemented modules including an electronic microlearning purchase management module and an electronic role based remittance module, the learning system operating in a learning environment and communicating with the learning users in the learning environment over the Internet-based computer network, the learning system enabling the plurality of learning users to communicate with one another in the learning environment, the learning system including an electronic learning content module database including a plurality of electronic learning content modules, each electronic learning content module associated with metadata describing a service charge and the remitted user in the plurality of remitted users; wherein the metadata of the electronic learning content module comprises at least one of an electronics textbook, an electronic journal, an instructional video, an instructional animation, a distinct mobile application, a browser based web application, a desktop application, an executable file, a program, add in, macro, plugin or instructions associated with a plurality of application programming interfaces of the learning system;

receiving, from each of a plurality of electronic user computing devices operated by respective ones of the learning users in the plurality of learning users over the Internet-based computer network, by the role based remittance module a respective purchase request specifying the corresponding electronic learning content module in the plurality of electronic learning content modules;

calculating, by a payment remittance module for each of the respective ones of the learning users, an updated account balance by subtracting the service charge described by the metadata associated with the corresponding learning content module from the corresponding account balance associated with the respective ones of the learning users;

granting access to the corresponding electronic learning content module on the learning user computing device operated by the respective one of the learning user based on the metadata of the electronic learning content module;

determining, by the role based remittance module, a time to remit each of the service charges associated with the respective ones of the electronic learning content modules based on the remittance cycle associated with the remitted user associated with the specified learning content module of the plurality of electronic learning content modules;

generating, by an electronic remittance summary interface generator of the role based remittance module, a first summary cell electronic interface for a tutoring user of the remitted users, the first summary cell electronic interface including a tutor access remittance item representing an aggregate remittance amount for the remittance cycle associated with the tutoring user, corresponding units of time of tutoring services provided by the tutoring user to one or more of the learning users, and an amount calculated based on the aggregate remittance amount and the units of time;

the remittance summary interface generator displaying the first summary cell electronic interface on an electronic computing device of the tutoring user;

wherein receiving the purchase request includes receiving a purchase request from a first of the learning users to purchase at least one of the tutoring services from the tutoring user over the Internet-based computer network, and deducting at least an amount of the service charge associated with the purchased tutoring service from an account balance of the first of the learning users, to produce an updated account balance for the first learning user;

generating, by the remittance summary interface generator, an account summary electronic interface for the first learning user to cause the updated account balance of the first learning user to be displayed to the first learning user through an electronic interface displayed on the corresponding electronic user computing device of the learning user;

generating, by the remittance summary interface generator, a second summary cell electronic interface for a learning content module authoring user, the second summary cell electronic interface including a learning content module remittance item representing an aggregate remittance amount for the remittance cycle associated with the learning content module authoring user, corresponding units of copies of applications authored by the learning content module authoring user, and an amount calculated based on the aggregate remittance amount and the units of copies;

the remittance summary interface generator displaying the second summary cell interface on an electronic computing device of the learning content module authoring user;

wherein receiving the purchase request includes receiving a purchase request from a second of the learning users to purchase one of the electronic learning content modules authored by the learning content module authoring user over the Internet-based computer network, and deducting at least an amount of the service charge associated with the purchased learning content module from an account balance of the second of the learning users, to produce an updated account balance for the second learning user;

generating, by the remittance summary interface generator, an account summary electronic interface for the second learning user to cause the updated account balance of the second learning user to be displayed to the second learning user through an electronic interface displayed on the corresponding electronic user computing device of the second learning user;

generating, by the remittance summary interface generator, a third summary cell electronic interface for a learning facility administrator user, the third summary cell interface including a learning facility administrator remittance item representing an aggregate remittance amount for the remittance cycle associated with the learning facility administrator user, corresponding units of time of a rental of a tangible item administered by the learning facility administrator user, and an amount calculated based on the aggregate remittance amount and the units of time of the rental;

the remittance summary interface generator displaying the third summary cell electronic interface on an electronic computing device of the learning facility administrator user;

wherein receiving the purchase request includes receiving a purchase request from a third of the learning users to purchase a rental of the tangible item administered by the learning facility administrator user over the Internet-based computer network, and deducting at least an amount of the service charge associated with the purchased rental from an account balance of the third of the learning users, to produce an updated account balance for the third learning user; and generating, by the remittance summary interface generator, an account summary electronic interface for the third learning user to cause the updated account balance of the third learning user to be displayed to the third learning user through an electronic interface displayed on the electronic user computing device of the third learning user.

8. The non-transitory computer-readable storage medium of claim 7, wherein the service charge associated with the specified learning content module includes a tax associated with a location of the learning user.

9. The non-transitory computer-readable storage medium of claim 7, further comprising:

aggregating, by the remittance module, a plurality of service charges associated with the plurality of electronic learning content modules associated with the remitted user;

remitting the service charge at the determined time comprises remitting the aggregated plurality of service charges wherein the remitted user is associated with the plurality of electronic learning content modules.

10. The computer-implemented method of claim 1, wherein the purchase request can be received from the user belonging to a learning management system or a social or a professional network.

11. The computer-implemented method of claim 10, wherein the purchase request can be generated by the user through the user computing device by accessing a mobile application or an internet-based web site/platform.

* * * * *